US012550086B2

(12) United States Patent
Wei et al.

(10) Patent No.: US 12,550,086 B2
(45) Date of Patent: Feb. 10, 2026

(54) SYNCHRONIZATION SIGNAL BASED MULTICAST TRANSMISSION

(71) Applicant: QUALCOMM INCORPORATED, San Diego, CA (US)

(72) Inventors: Chao Wei, Beijing (CN); Min Huang, Beijing (CN); Hao Xu, Beijing (CN); Qiaoyu Li, Beijing (CN); Jing Dai, Beijing (CN); Chenxi Hao, Beijing (CN); Wei Xi, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 418 days.

(21) Appl. No.: 17/997,076

(22) PCT Filed: Jun. 30, 2020

(86) PCT No.: PCT/CN2020/099376
§ 371 (c)(1),
(2) Date: Oct. 25, 2022

(87) PCT Pub. No.: WO2022/000295
PCT Pub. Date: Jan. 6, 2022

(65) Prior Publication Data
US 2023/0209485 A1 Jun. 29, 2023

(51) Int. Cl.
*H04W 56/00* (2009.01)
*H04W 72/1263* (2023.01)
*H04W 72/23* (2023.01)

(52) U.S. Cl.
CPC ... *H04W 56/0015* (2013.01); *H04W 72/1263* (2013.01); *H04W 72/23* (2023.01)

(58) Field of Classification Search
CPC ............ H04W 56/0015; H04W 72/23; H04W 72/1263
See application file for complete search history.

(56) References Cited

U.S. PATENT DOCUMENTS

| 2018/0049006 A1* | 2/2018 | Hong ...................... H04L 67/60 |
| 2019/0223156 A1* | 7/2019 | Fujishiro ............... H04W 76/15 |

(Continued)

FOREIGN PATENT DOCUMENTS

| CN | 109561499 A | 4/2019 |
| CN | 110381578 A | 10/2019 |

(Continued)

OTHER PUBLICATIONS

Supplementary European Search Report—EP20942482—Search Authority—The Hague—Mar. 13, 2024.

(Continued)

*Primary Examiner* — Michael Thier
*Assistant Examiner* — Tracy Lauren Raimondo
(74) *Attorney, Agent, or Firm* — Holland & Hart LLP

(57) ABSTRACT

Methods, systems, and devices for wireless communications are described. A base station may transmit one or more synchronization signal blocks (SSBs), each SSB including a system information block (SIB), to one or more user equipments (UEs). A UE of the one or more UEs may select an SSB with a corresponding SSB index for receiving a SIB and subsequently a multicast transmission from the base station. The multicast transmission may include transmitting a multicast control channel, a multicast traffic channel, or both. The SIB may include one or more parameters for receiving the multicast transmission. The UE may identify one or more monitoring occasions for monitoring a physical downlink control channel for scheduling the multicast transmission based on the SSB index. The UE may receive the multicast transmission in accordance with the one or more parameters from the physical downlink control channel during the one or more monitoring occasions.

27 Claims, 18 Drawing Sheets

(56) References Cited

U.S. PATENT DOCUMENTS

| | | | |
|---|---|---|---|
| 2019/0327767 A1 | 10/2019 | Islam et al. | |
| 2020/0154413 A1* | 5/2020 | Hosseini | H04W 72/0446 |
| 2020/0275420 A1* | 8/2020 | Chen | H04W 48/12 |
| 2020/0296635 A1* | 9/2020 | Rastegardoost | H04L 5/0048 |
| 2022/0353710 A1* | 11/2022 | Yoshioka | H04W 4/06 |
| 2023/0354371 A1* | 11/2023 | Huang | H04W 72/232 |

FOREIGN PATENT DOCUMENTS

| | | |
|---|---|---|
| CN | 110475319 A | 11/2019 |
| CN | 110972515 A | 4/2020 |
| CN | 111294943 A | 6/2020 |
| WO | WO-2019201442 A1 | 10/2019 |
| WO | WO-2020028785 | 2/2020 |
| WO | WO-2020033562 A1 | 2/2020 |

OTHER PUBLICATIONS

Huawei, et al., "Definition for the CSI-RS Based Intra-Frequency and Inter-Frequency Measurement", 3GPP TSG-RAN WG4 Meeting #94-e, R4-2001656, Mar. 6, 2020 (Mar. 6, 2020), 4 Pages, whole document the.

International Search Report and Written Opinion—PCT/CN2020/099376—ISA/EPO—Mar. 25, 2021.

* cited by examiner

SYNCHRONIZATION SIGNAL BASED MULTICAST TRANSMISSION

CROSS REFERENCE

The present Application is a 371 national stage filing of International PCT Application No. PCT/CN2020/099376 by WEI et al. entitled "SYNCHRONIZATION SIGNAL BASED MULTICAST TRANSMISSION," filed Jun. 30, 2020, which is assigned to the assignee hereof, and which is expressly incorporated by reference in its entirety herein.

FIELD OF TECHNOLOGY

The following relates generally to wireless communications and more specifically to synchronization signal based multicast transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support synchronization signal based multicast transmission. Generally, the described techniques provide for a base station to transmit one or more synchronization signal blocks (SSBs), each SSB including a multicast transmission (e.g., a multicast control channel (MCCH) or a multicast traffic channel (MTCH) transmission), to one or more user equipments (UEs). In some cases, the base station may transmit a downlink control channel (e.g., a physical downlink control channel (PDCCH)) for scheduling the multicast transmission during one or more monitoring occasions. A UE of the one or more UEs may select an SSB with a corresponding SSB index for receiving the multicast transmission from the base station. Each of the one or more monitoring occasions may be associated with a corresponding SSB index. The UE may monitor the downlink control channel for the multicast transmission during the one or more monitoring occasions based on the SSB index. For example, the UE may monitor for the multicast transmission during an on duration of a scheduling period (e.g., a discontinuous reception (DRX) scheduling period or a multicast transmission repetition period) according to one or more monitoring occasions associated with the downlink control channel. The UE may receive the multicast transmission from the base station during the one or more monitoring occasions, which may improve signal quality at the UE.

A method of wireless communications at a UE is described. The method may include selecting an SSB for receiving, from a base station, a multicast transmission, the SSB having a corresponding SSB index, identifying one or more monitoring occasions for monitoring of a downlink control channel for scheduling multicast transmissions based on the SSB index, and receiving the multicast transmission in accordance with the downlink control channel and during the one or more monitoring occasions.

An apparatus for wireless communications at a UE is described. The apparatus may include a processor, memory coupled with the processor, and instructions stored in the memory. The instructions may be executable by the processor to cause the apparatus to select an SSB for receiving, from a base station, a multicast transmission, the SSB having a corresponding SSB index, identify one or more monitoring occasions for monitoring of a downlink control channel for scheduling multicast transmissions based on the SSB index, and receive the multicast transmission in accordance with the downlink control channel and during the one or more monitoring occasions.

Another apparatus for wireless communications at a UE is described. The apparatus may include means for selecting an SSB for receiving, from a base station, a multicast transmission, the SSB having a corresponding SSB index, identifying one or more monitoring occasions for monitoring of a downlink control channel for scheduling multicast transmissions based on the SSB index, and receiving the multicast transmission in accordance with the downlink control channel and during the one or more monitoring occasions.

A non-transitory computer-readable medium storing code for wireless communications at a UE is described. The code may include instructions executable by a processor to select an SSB for receiving, from a base station, a multicast transmission, the SSB having a corresponding SSB index, identify one or more monitoring occasions for monitoring of a downlink control channel for scheduling multicast transmissions based on the SSB index, and receive the multicast transmission in accordance with the downlink control channel and during the one or more monitoring occasions.

In some examples of the method, apparatuses, and non-transitory computer-readable medium described herein, receiving the multicast transmission may include operations, features, means, or instructions for receiving, from the base station, an MCCH, an MTCH, or both.

In some examples of the method, apparatuses, and non-transitory computer-readable medium described herein, receiving the MTCH may include operations, features, means, or instructions for receiving the MTCH via a narrow beam associated with a channel state information-reference signal (CSI-RS).

In some examples of the method, apparatuses, and non-transitory computer-readable medium described herein, the CSI-RS may be configured as a quasi-collocation (QCL) reference for the MTCH.

In some examples of the method, apparatuses, and non-transitory computer-readable medium described herein, identifying the one or more monitoring occasions may include operations, features, means, or instructions for identifying that the one or more monitoring occasions correspond to the SSB index, where the one or more monitoring occasions may be interleaved with other monitoring occasions corresponding to other SSB indices, the one or more monitoring occasions and the other monitoring occasions being organized into sets of monitoring occasions, each set including one monitoring occasion per SSB index and organized sequentially by SSB index.

In some examples of the method, apparatuses, and non-transitory computer-readable medium described herein, identifying the one or more monitoring occasions may include operations, features, means, or instructions for identifying that the one or more monitoring occasions include a first set of monitoring occasions corresponding to the SSB index, where other sets of monitoring occasions correspond to other SSB indices, each set also corresponding to a respective period for receiving the multicast transmissions.

In some examples of the method, apparatuses, and non-transitory computer-readable medium described herein, the respective periods for receiving the multicast transmissions include respective MCCH repetition periods, respective DRX scheduling periods for an MTCH, or both.

In some examples of the method, apparatuses, and non-transitory computer-readable medium described herein, identifying the one or more monitoring occasions may include operations, features, means, or instructions for identifying that the one or more monitoring occasions may be within a first search space set corresponding to the SSB index, where other sets of monitoring occasions may be within other search space sets corresponding to other SSB indices.

Some examples of the method, apparatuses, and non-transitory computer-readable medium described herein may further include operations, features, means, or instructions for receiving, from the base station, an indication of the first search space set and the other search space sets.

In some examples of the method, apparatuses, and non-transitory computer-readable medium described herein, the first search space set and the other search space sets do not overlap in time and may be associated with the same control resource set (CORESET).

In some examples of the method, apparatuses, and non-transitory computer-readable medium described herein, the first search space set and the other search space sets may be associated with different CORESETs.

A method of wireless communications at a base station is described. The method may include transmitting a set of SSBs, each of the set of SSBs including a multicast transmission to be received by a UE and transmitting, to the UE, a downlink control channel for scheduling the multicast transmission during one or more monitoring occasions, where different ones of the one or more monitoring occasions are associated with different ones of the set of SSBs such that each of the one or more monitoring occasions is associated with a corresponding SSB index.

An apparatus for wireless communications at a base station is described. The apparatus may include a processor, memory coupled with the processor, and instructions stored in the memory. The instructions may be executable by the processor to cause the apparatus to transmit a set of SSBs, each of the set of SSBs including a multicast transmission to be received by a UE and transmit, to the UE, a downlink control channel for scheduling the multicast transmission during one or more monitoring occasions, where different ones of the one or more monitoring occasions are associated with different ones of the set of SSBs such that each of the one or more monitoring occasions is associated with a corresponding SSB index.

Another apparatus for wireless communications at a base station is described. The apparatus may include means for transmitting a set of SSBs, each of the set of SSBs including a multicast transmission to be received by a UE and transmitting, to the UE, a downlink control channel for scheduling the multicast transmission during one or more monitoring occasions, where different ones of the one or more monitoring occasions are associated with different ones of the set of SSBs such that each of the one or more monitoring occasions is associated with a corresponding SSB index.

A non-transitory computer-readable medium storing code for wireless communications at a base station is described. The code may include instructions executable by a processor to transmit a set of SSBs, each of the set of SSBs including a multicast transmission to be received by a UE and transmit, to the UE, a downlink control channel for scheduling the multicast transmission during one or more monitoring occasions, where different ones of the one or more monitoring occasions are associated with different ones of the set of SSBs such that each of the one or more monitoring occasions is associated with a corresponding SSB index.

In some examples of the method, apparatuses, and non-transitory computer-readable medium described herein, the one or more monitoring occasions may be organized into sets of monitoring occasions, each set including one monitoring occasion per SSB index and organized sequentially by SSB index.

In some examples of the method, apparatuses, and non-transitory computer-readable medium described herein, the one or more monitoring occasions may be organized into sets of monitoring occasions based on SSB index, each set also corresponding to a respective period for transmitting multicast transmissions.

In some examples of the method, apparatuses, and non-transitory computer-readable medium described herein, the respective periods for transmitting the multicast transmissions include respective MCCH repetition periods, respective discontinuous reception (DRX) scheduling periods for an MTCH, or both.

In some examples of the method, apparatuses, and non-transitory computer-readable medium described herein, the one or more monitoring occasions may be organized into search space sets based on SSB index.

Some examples of the method, apparatuses, and non-transitory computer-readable medium described herein may further include operations, features, means, or instructions for transmitting, to the UE, an indication of the search space sets.

In some examples of the method, apparatuses, and non-transitory computer-readable medium described herein, the search space sets do not overlap in time and may be associated with the same CORESET.

In some examples of the method, apparatuses, and non-transitory computer-readable medium described herein, the search space sets may be associated with different CORESETs.

In some examples of the method, apparatuses, and non-transitory computer-readable medium described herein, transmitting the multicast transmission may include operations, features, means, or instructions for transmitting, to the UE, an MCCH, an MTCH, or both.

In some examples of the method, apparatuses, and non-transitory computer-readable medium described herein, transmitting the multicast traffic channel may include operations, features, means, or instructions for transmitting the multicast traffic channel via a narrow beam associated with a CSI-RS.

In some examples of the method, apparatuses, and non-transitory computer-readable medium described herein, the CSI-RS may be configured as a QCL reference for the multicast traffic channel.

DETAILED DESCRIPTION

In some examples, a base station may transmit a multicast message to one or more user equipments (UEs). For example, one or more UEs may subscribe to a service in which the base station transmits one or more messages (i.e., a multicast transmission). In some examples, the multicast transmission may include control information on a multicast control channel (MCCH), multimedia broadcast multicast services (MBMS) data on a multicast traffic channel (MTCH), or both. In some cases, the base station may dynamically schedule the MCCH, the MTCH, or both using a radio network temporary identifier (RNTI). In some examples, a UE may monitor a downlink control channel (e.g., a physical downlink control channel (PDCCH)) according to a discontinuous reception (DRX) operation defined in the SIB for the MCCH. There may be a predefined mapping between PDCCH monitoring occasions and a synchronization signal block (SSB) index that includes the SIB scheduling the MCCH. That is, the SSB on which the UE receives a system information block (SIB) may be predefined, or fixed, which may result in poor signal quality at the UE.

As described herein, a UE may select an SSB with a corresponding SSB index for receiving a SIB and subsequently an MCCH from a base station, which may improve signal quality at the UE (e.g., because the UE may select the SSB with the highest signal quality). In some cases, the base station may transmit the SIB to the UE, the SIB including one or more parameters indicating the location of an MCCH. The UE may monitor for the MCCH based on parameters included in the SIB and the SSB index during one or more monitoring occasions. For example, the UE may monitor for the MCCH during an on duration of a scheduling period (e.g., a DRX scheduling period or an MCCH repetition period) according to one or more monitoring occasions associated with a PDCCH. In some cases, the one or more monitoring occasions associated with the PDCCH may be sequentially numbered and mapped to an SSB beam in a MCCH repetition period. In some other cases, the scheduling period (e.g., including the one or more monitoring occasions) may be associated with a single SSB beam. Additionally or alternatively, the base station may configure one or more PDCCH search spaces, each associated with an SSB. The base station may transmit the MCCH to the UE during a monitoring occasion of the one or more monitoring occasions. In some cases, the UE may monitor for the MTCH based on receiving the MCCH.

Aspects of the disclosure are initially described in the context of wireless communications systems. Additional aspects of the disclosure are described with reference to timelines and a process flow. Aspects of the disclosure are further illustrated by and described with reference to apparatus diagrams, system diagrams, and flowcharts that relate to synchronization signal based multicast transmission.

Figure 1:
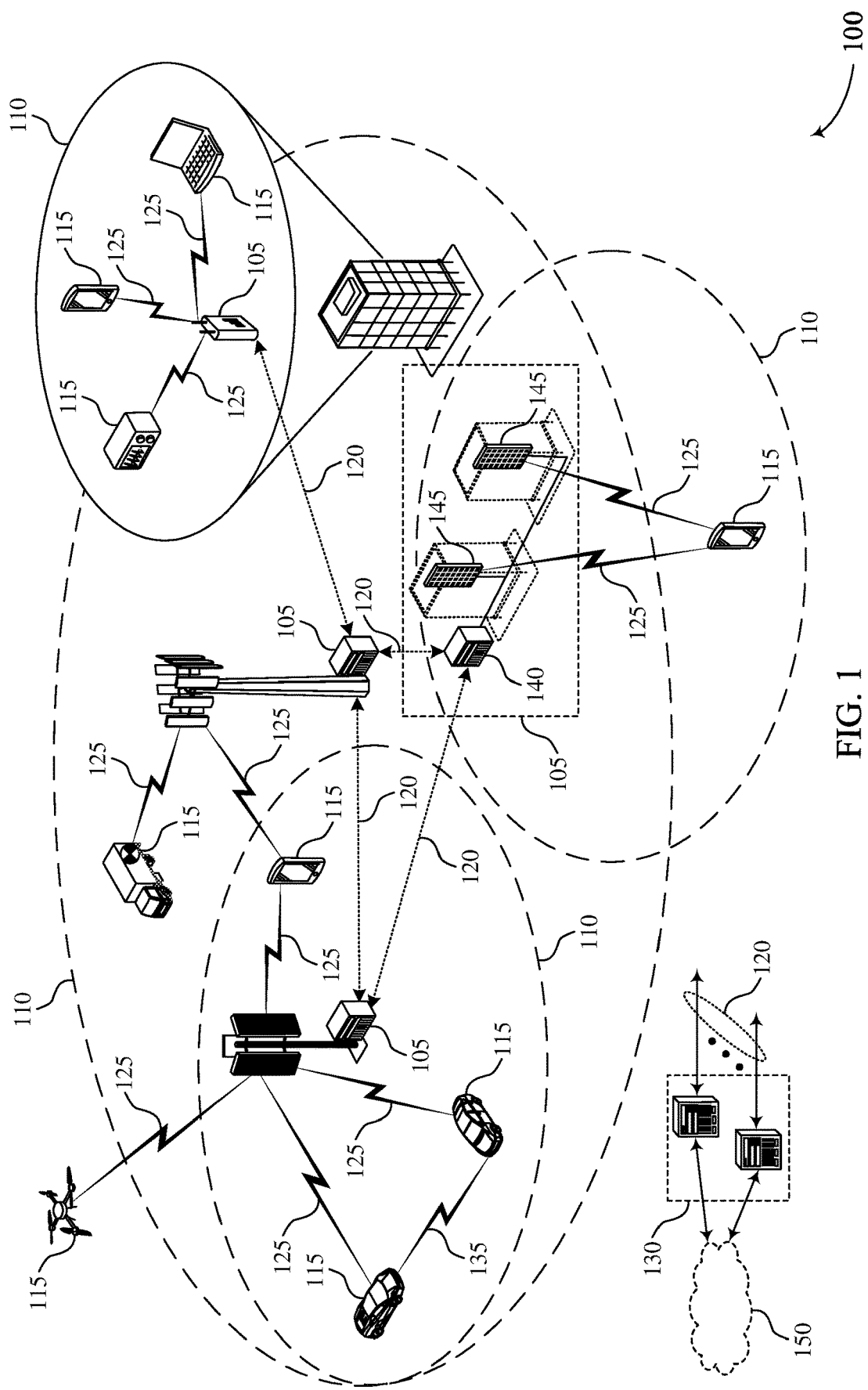
FIGS. 1 and 2 illustrate examples of wireless communications systems that support synchronization signal based multicast transmission in accordance with aspects of the present disclosure.

FIG. 1 illustrates an example of a wireless communications system 100 that supports synchronization signal based multicast transmission in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, such as in wireless communications system 100, a base station 105 may transmit a multicast message to one or more UEs 115. For example, one or more UEs 115 may subscribe to a service in which the base station 105 transmits one or more messages (i.e., a multicast transmission). Such communications may be referred to as single cell point to multipoint (SC-PTM) and may be used to support MBMS. In some examples, the multicast transmission may include control information on an MCCH, MBMS data on an MTCH, or both. In some cases, the base station 105 may dynamically schedule the multicast transmission using an RNTI (e.g., a single cell-RNTI (SC-RNTI) for MCCH, and respective group-RNTIs (G-RNTIs) for different MBMSs). The base station 105 may provide control information, such as respective G-RNTIs used for different MBMSs, to subscribed UEs 115 on an MCCH. In some examples, a SIB may include information (e.g., one or more parameters) for a UE 115 to monitor for an MCCH. For example, the UE 115 may monitor a downlink control channel (e.g., a PDCCH) according to a DRX operation defined in the SIB for the MCCH. However, there may be a predefined mapping between PDCCH monitoring occasions and an SSB index that includes the SIB. That is, the SSB on which the UE 115 receives a SIB may be predefined, or fixed, which may result in poor signal quality at the UE 115.

The wireless communications system 100 may support the use of techniques that enable a UE 115 to select an SSB with a corresponding SSB index for receiving a SIB and subsequently a multicast transmission from a base station 105, which may improve signal quality at the UE 115 (e.g., because the UE 115 may select the SSB with the highest signal quality). In some cases, the base station 105 may transmit a SIB to the UE 115, the SIB including one or more parameters indicating the location of an MCCH. The UE 115 may monitor for the MCCH based on parameters included in the SIB and the SSB index during one or more monitoring occasions. For example, the UE 115 may monitor for the MCCH for an on duration during a scheduling period (e.g., a DRX scheduling period or an MCCH repetition period) according to one or more monitoring occasions associated with a PDCCH. In some cases, the one or more monitoring occasions associated with the PDCCH may be sequentially numbered and mapped to an SSB beam in a MCCH repetition period. In some other cases, the scheduling period (e.g., including the one or more monitoring occasions) may be associated with a single SSB beam. Additionally or alternatively, the base station 105 may configure one or more PDCCH search spaces, each associated with an SSB. The base station 105 may transmit the PDCCH for scheduling a multicast transmission to the UE 115 during a monitoring occasion of the one or more monitoring occasions. In some cases, the UE 115 may monitor for the MTCH based on receiving the MCCH.

Figure 2:
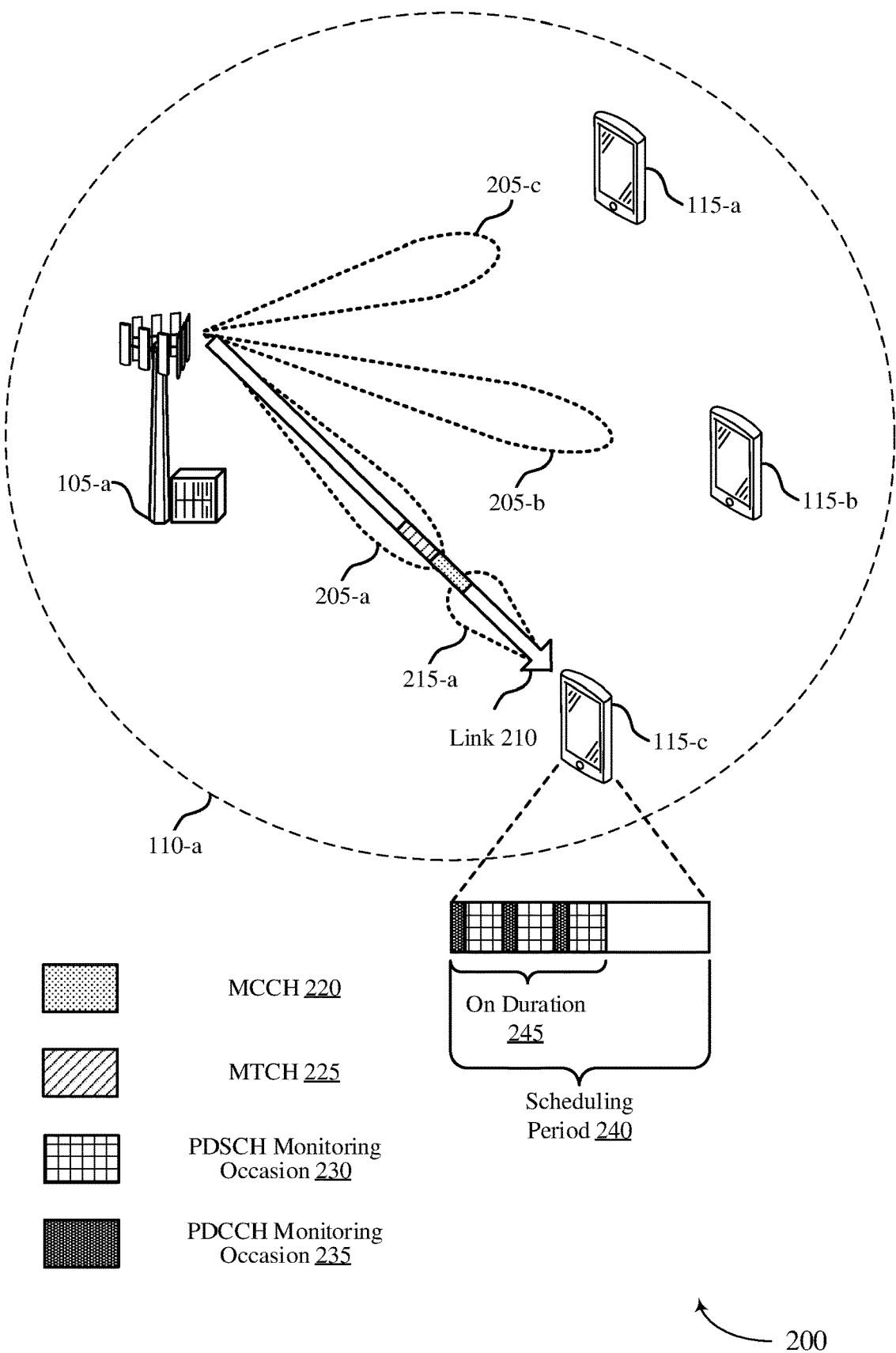

FIG. 2 illustrates an example of a wireless communications system 200 that supports synchronization signal based multicast transmission in accordance with aspects of the present disclosure. In some examples, wireless communications system 200 may implement aspects of wireless communication system 100 and may include UE 115-*a*, UE 115-*b*, UE 115-*c*, and base station 105-*a* with coverage area 110-*a*, which may be examples of UEs 115 and a base station 105 described with reference to FIG. 1. Although three UEs 115 are illustrated in FIG. 2, base station 105-*a* may serve any number of UEs 115. As described herein, a UE 115 may select an SSB for receiving a SIB with parameters corresponding to a multicast transmission from a base station, which may reduce signaling overhead (e.g., due to retransmissions) at the UE 115.

In some cases, such as in wireless communications system 200, a base station 105 may transmit a multicast message to one or more UEs 115 via one or more transmit beams 205 during a slot. For example, one or more UEs 115 may subscribe to a service in which the base station 105 transmits one or more messages. In some examples, UE 115-*a*, UE 115-*b*, UE 115-*c*, or a combination may subscribe to receive a multicast transmission from base station 105-*a*. For example, UE 115-*c* may receive a multicast transmission from base station 105-*a* via link 210 (e.g., using transmit beam 205-*a* and receive beam 215-*a*), which may implement aspects of a communication link 125 as described with reference to FIG. 1. In some examples, the multicast transmission may include control information on an MCCH 220, MBMS data on an MTCH 225, or both.

In some cases, an MTCH 225 may be mapped to a downlink shared channel (e.g., a physical downlink shared channel (PDSCH) 230). The MTCH 225 may carry MBMS information (e.g., data corresponding to a MBMS service). Base station 105-*a* may dynamically schedule the MTCH 225 using an RNTI (e.g., a G-RNTI). Base station 105-*a* may provide control information, such as the G-RNTI, to subscribed UEs 115 on an MCCH 220. Base station 105-*a* may dynamically schedule the MCCH 220 using a different RNTI (e.g., an SC-RNTI).

In some examples, a SIB may include information for a UE 115 to receive an MCCH 220. For example, the SIB may include one or more parameters such as an MCCH offset (sc-mcch-Offset), a repetition period (sc-mcch-Repetition-Period), a first subframe (sc-mcch-FirstSubframe), a duration (sc-mcch-duration), a modification period (sc-mcch-ModificationPeriod), and the like. Within an MCCH modification period, the same MCCH information may be transmitted periodically. For example, a base station 105 may transmit MCCH information (e.g., an SC-PTM configuration (SCPTMConfiguration)) according to a configurable repetition period. The repetition period may be based on a radio frame corresponding to a single-frequency network (SFN). For example, the repetition period may start from a radio frame for which an sc-mcch-RepetitionPeriod for an SFN is equal to an sc-mcch-Offset. In some examples, the base station 105 may indicate radio frequency resource, modulation coding scheme, or a combination via a PDCCH. In some cases, the start of a multicast modification period may correspond to when a sc-mcch-ModificationPeriod for an SFN is equal to zero. In some examples, MCCH information may change for a new modification period. The base station 105 may indicate the change to a UE 115 via downlink control information (DCI) format addressed by SC-RNTI. In some cases, the UE 115 may acquire the new MCCH information in resources scheduled by the DCI.

In some cases, multicast configuration information (i.e., SCPTMConfiguration carried by a MCCH) may indicate one or more MBMS sessions to be transmitted using an MTCH as well as scheduling information for each session. For example, the multicast configuration information for each MBMS session may include a G-RNTI, a scheduling period, a start offset, DRX information, or a combination. In some cases, a base station 105 may use dynamic scheduling for an MCCH 220, an MTCH 225, or both. For example, a UE 115 may monitor a PDCCH, which may be scrambled by SC-RNTI, on MCCH subframes for MCCH scheduling and the PDCCH scrambled by G-RNTI on MTCH subframes for MTCH scheduling. If a DRX operation is configured for multicast services (e.g., for SC-PTM), the UE 115 may monitor the PDCCH for an MCCH 220, an MTCH 225, or both discontinuously during the DRX active time, and may refrain from monitoring the PDCCH during the inactive time. In some cases, the UE 115 may perform the DRX operation independently for each G-RNTI, SC-RNTI, or both. That is, the base station 105 may configure one or more timers (e.g., an onDurationTimerSCPTM, a drx-Inactivity-TimerSCPTM, an SCPTM-SchedulingCycle, or a combination) and the value of an offset (e.g., SCPTM-Scheduling-Offset) for each G-NRTI, SC-RNTI, or both.

In some cases, a base station 105 may use multiple beams to transmit a multicast transmission to one or more UEs 115. For example, base station 105-*a* may transmit a PDCCH, a PDSCH, or both using one or more wide beams, each associated with an SSB, or one or more narrow CSI-RS beams associated with a UE 115. In some examples, the UE 115 may assume a demodulation reference signal (DMRS) antenna port of the PDCCH, the PDSCH, or both are quasi co-located (QCL) with an SSB determined in an initial access procedure. In some cases, base station 105-*a* may transmit a SIB or a paging message to one or more UEs 115 using the one or more wide beams (e.g., via transmit beam 205-*a*, transmit beam 205-*b*, or transmit beam 205-*c*, associated with one or more SSBs). However, there may be a predefined mapping between PDCCH monitoring occasions and the SSB index for monitoring for a SIB or a paging message. That is, the SSB that the UE 115 receives a SIB on may be predefined, or fixed, which may result in poor signal quality at the UE 115.

The wireless communications system 200 may support the use of techniques that enable a UE 115 to select an SSB with a corresponding SSB index for receiving a SIB and subsequently an MCCH 220, an MTCH 225, or both from a base station 105, which may improve signal quality at the UE 115 (e.g., because the UE 115 may select the SSB with the highest signal quality). In some cases, base station 105-*a* may transmit a SIB to UE 115-*c*, the SIB including one or more parameters indicating the location of an MCCH 220. UE 115-*c* may monitor for the MCCH 220 based on parameters included in the SIB and the SSB index during one or more monitoring occasions (e.g., including a PDSCH monitoring occasion 230, a PDCCH monitoring occasion 235, or both). For example, UE 115-*c* may monitor for the MCCH 220 for an on duration 245 during a scheduling period 240 according to one or more monitoring occasions associated with a PDCCH (e.g., PDCCH monitoring occasions 235). In some cases, the one or more monitoring PDCCH monitoring occasions 235 may be sequentially numbered and mapped to an SSB beam in a MCCH repetition period, which is described in further detail with respect to FIG. 3. In some other cases, the scheduling period 240 (e.g., including the one or more monitoring occasions) may be associated with a single SSB beam, which is described in further detail with respect to FIG. 4. Additionally or alternatively, base station 105-*a* may configure one or more PDCCH search spaces, each associated with an SSB, which is described in further detail with respect to FIG. 5. Base station 105-*a* may transmit the MCCH 220 to UE 115-*c* during a monitoring occasion of the one or more monitoring occasions. In some cases, UE 115-*c* may monitor for the MTCH 225 based on receiving the MCCH 220.

In some cases, a transmit beam 205 may be a wide beam associated with an SSB. In some other cases, a transmit beam 205 may be a narrow channel state information-reference signal (CSI-RS) transmit beam. The base station 105 may use the narrow CSI-RS beam to transmit an MTCH. For example, the base station 105 may configure an CSI-RS as a QCL reference for the MTCH transmission. That is, a CSI-RS resource may be configured as part of a multicast configuration (e.g., an SC-PTM configuration carried by an MCCH) and may be used as a QCL reference in a PDCCH, a PDSCH, or both transmission associated with an MTCH. In some examples, the UE 115 may assume the DMRS antenna port of a PDCCH or PDSCH are QCL with the configured CSI-RS resource in the multicast configuration. In some cases, the narrow CSI-RS beam may provide an increase in beamforming gain, which may reduce receive time while improving power consumption at the UE 115 (e.g., by enabling higher modulation coding scheme (MCS), transport block size (TBS), or both).

Figure 3:
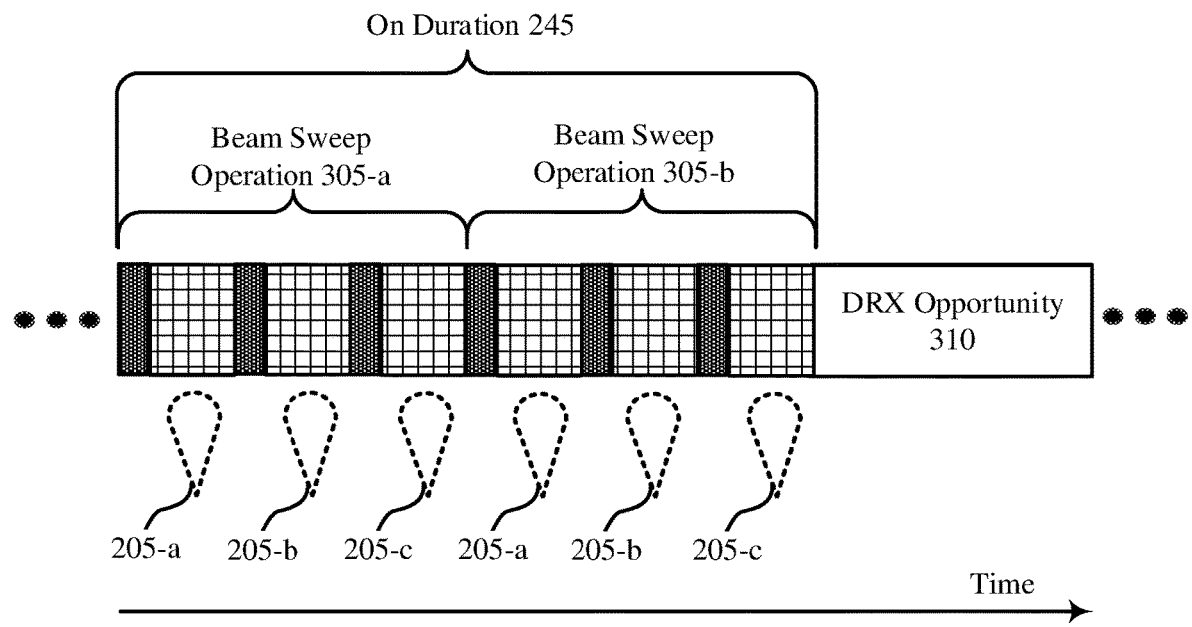
FIGS. 3 through 5 illustrate examples of timelines that support synchronization signal based multicast transmission in accordance with aspects of the present disclosure.

FIG. 3 illustrates an example of a timeline 300 that supports synchronization signal based multicast transmission in accordance with aspects of the present disclosure. In some examples, timeline 300 may implement aspects of wireless communications systems 100, wireless communications system 200, or both and may include transmit beams 205, PDSCH monitoring occasions 230, PDCCH monitoring occasions 235, an on duration 245, which may be examples of transmit beams 205, PDSCH monitoring occasions 230, PDCCH monitoring occasions 235, and an on duration 245 as described with reference to FIG. 2. The process illustrated by timeline 300 may be implemented at a UE 115 or a base station 105 as described with reference to FIGS. 1 and 2. For example, the timeline 300 may illustrate a method in which a UE 115 may monitor for a multicast channel (e.g., an MCCH or an MTCH) during one or more monitoring occasions in an MCCH repetition period or a DRX scheduling period for MTCH. In some cases, the MCCH repetition period may include an on duration 245 with one or more beam sweep operations 305 and a DRX opportunity 310.

In some cases, a UE 115 may select an SSB with a corresponding SSB index for receiving a SIB from a base station 105, as described with reference to FIG. 2. In some cases, the UE 115 may monitor for a multicast channel (e.g. an MCCH or an MTCH) during one or more monitoring occasions based on the SSB index. In some cases, a monitoring occasion may include a PDCCH monitoring occasion 235 and may have a monitoring occasion index. In some examples, the UE 115 may receive a PDCCH during the PDCCH monitoring occasion 235. In some cases, the PDSCH transmission occasion corresponding to the PDSCH monitoring occasion 230 may be based on the received PDCCH. Although six monitoring occasions with three per beam sweep operation 305 are illustrated in FIG. 3, an on duration 245 or a beam sweep 305 may include any number of monitoring occasions. In some examples, during an on duration 245, the UE 115 may perform one or more beam sweep operations 305 for an MCCH message. For example, the UE 115 may perform beam sweep operation 305-a for a first MCCH message and beam sweep operation 305-b for a second MCCH message. In some cases, the monitoring occasions may be sequentially numbered. That is, the monitoring occasion index may count up from left to right with respect to timeline 300. Additionally, the monitoring occasions may be mapped to a transmit beam 205 associated with an SSB.

In some cases, the $[x \times N+K]^{th}$ PDCCH monitoring occasion 235 in an MCCH repetition period (i.e., on duration 245 and DRX opportunity 310) may correspond to the $K^{th}$ transmit beam 205 associated with an SSB, where N is the number of transmit beams and x is equal to the number of PDCCH monitoring occasions 230 in an MCCH repetition period divided by N. For example, the first three monitoring occasions in beam sweep operation 305-a correspond to transmit beam 205-a, transmit beam 205-b, and transmit beam 205-c respectively. In some examples, each transmit beam 205 may correspond to a different SSB. Additionally or alternatively, a set of N consecutive PDCCH monitoring occasions 235 in a MCCH repetition period may be defined as an MCCH transmission instance. That is, the $K^{th}$ PDCCH monitoring occasion 235 in the MCCH transmission instance may correspond to the $K^{th}$ transmitted SSB.

In some cases, the transmit beams may repeat for each beam sweep operation 305-b. For example, the first three monitoring occasions in beam sweep operation 305-b correspond to transmit beam 205-a, transmit beam 205-b, and transmit beam 205-c respectively. In some cases, such as when there are more than one PDSCH MCCH messages to receive during a repetition period, a UE 115 may wait for N PDCCH monitoring occasions 230 to receive the next PDCCH scheduling MCCH. Thus, it may be beneficial for one or more PDCCH monitoring occasions 235 during an MCCH repetition period or DRX scheduling period for MTCH to be associated with a single transmit beam 205, which is described in further detail with respect to FIG. 4.

Figure 4:
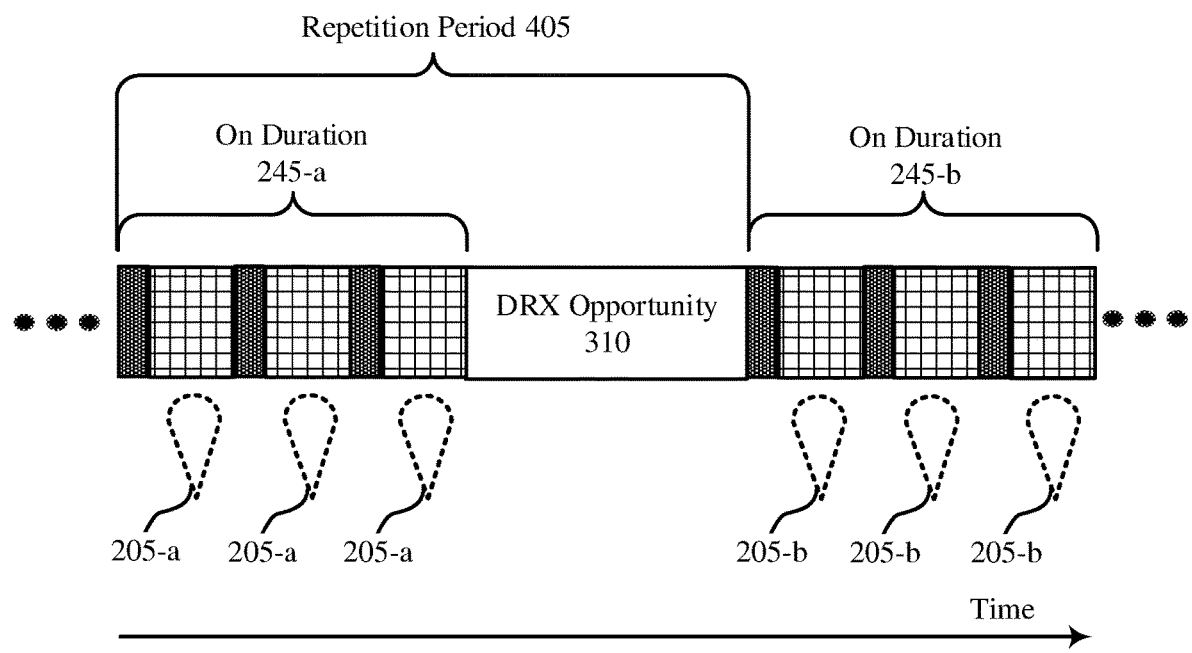

FIG. 4 illustrates an example of a timeline 400 that supports synchronization signal based multicast transmission in accordance with aspects of the present disclosure. In some examples, timeline 400 may implement aspects of wireless communications systems 100, wireless communications system 200, or both and may include transmit beams 205, PDSCH monitoring occasions 230, PDCCH monitoring occasions 235, on durations 245, which may be examples of transmit beams 205, PDSCH monitoring occasions 230, PDCCH monitoring occasions 235, and on durations 245 as described with reference to FIG. 2. The process illustrated by timeline 400 may be implemented at a UE 115 or a base station 105 as described with reference to FIGS. 1 and 2. For example, the timeline 400 may illustrate a method in which a UE 115 may monitor for a multicast channel (e.g., an MCCH or an MTCH) during one or more monitoring occasions in a repetition period 405, which may be an MCCH repetition period or a DRX scheduling period for MTCH. In some cases, the repetition period 405 may include an on duration 245 and a DRX opportunity 310.

In some cases, a monitoring occasion may include a PDCCH monitoring occasion 235 and may have a monitoring occasion index. There may be one or more monitoring occasions per on duration 245 during a repetition period 405. For example, FIG. 3 illustrates three monitoring occasions during on duration 245-a and during on duration 245-b. In some cases, one or more PDCCH monitoring occasions 235 during a repetition period 405 may be associated with a transmit beam 205. For example, the PDCCH monitoring occasions 235 during on duration 245-a may be associated with transmit beam 205-a. Similarly, the PDCCH monitoring occasions 235 during on duration 245-b may be associated with transmit beam 205-b. In some cases, on duration 245-b may be associated with a different repetition period 405 than on duration 245-a. In some examples, the time that the UE 115 is active (i.e., the on duration 245) may depend on the number of PDCCHs, PDSCHs, or both transmitted by a base station 105 (e.g., not the total number of transmit beams 205 associated with SSBs), which may improve power saving at the UE 115 among other benefits.

Figure 5:
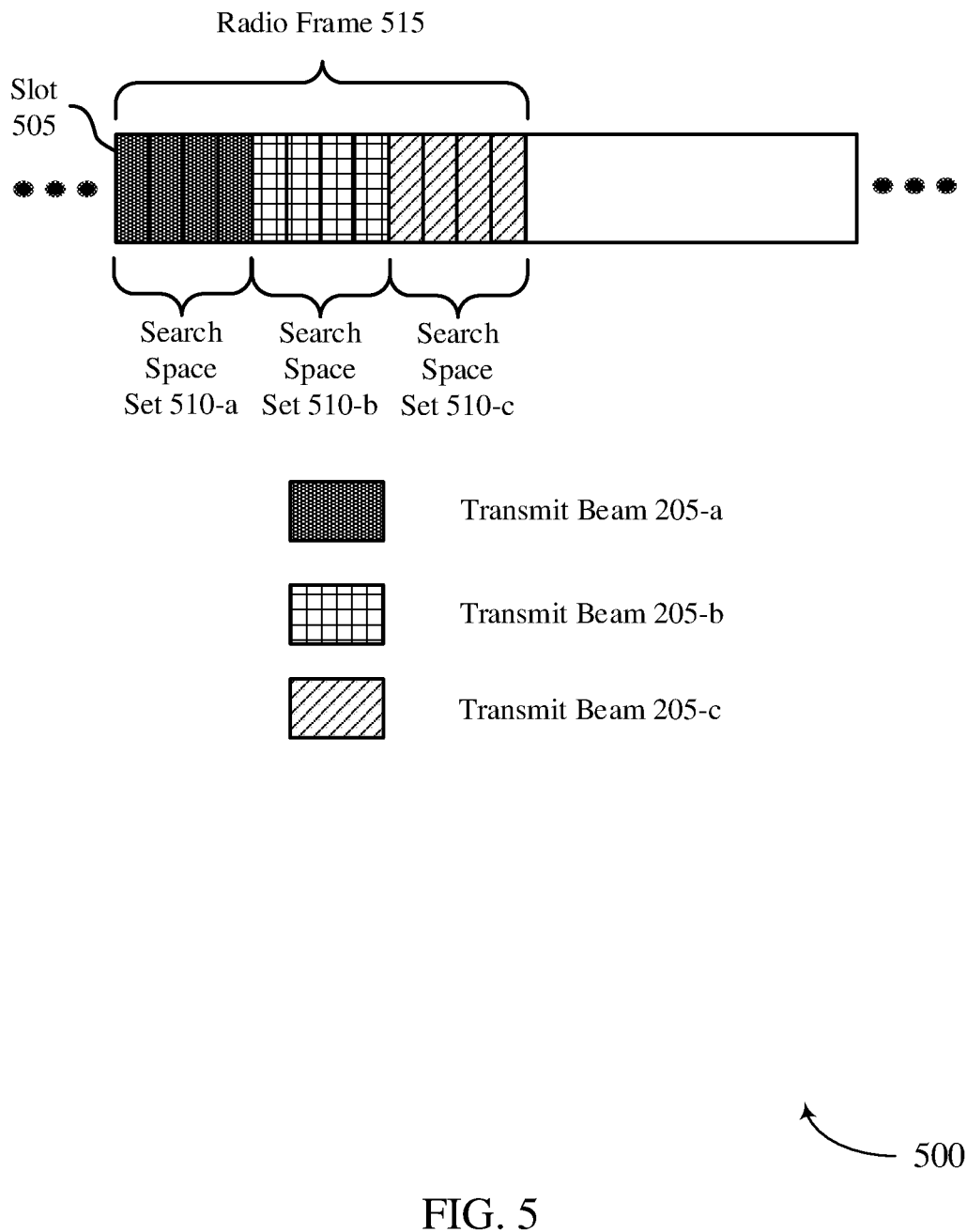

FIG. 5 illustrates an example of a timeline 500 that supports synchronization signal based multicast transmission in accordance with aspects of the present disclosure. In some examples, timeline 500 may implement aspects of wireless communications systems 100, wireless communications system 200, or both and may include transmit beams 205, which may be examples of transmit beams 205 as described with reference to FIG. 2. The process illustrated by timeline 500 may be implemented at a UE 115 or a base station 105 as described with reference to FIGS. 1 and 2. For example, the timeline 500 may illustrate a method in which a UE 115 may monitor for a multicast channel (e.g., an MCCH or an MTCH) during one or more slots 505 in search space sets 510 in a radio frame 515.

In some cases, a PDCCH monitoring periodicity may be a predetermined period of time (e.g., 20 milliseconds (ms)). The PDCCH monitoring periodicity may include one or more radio frames, which may include any number of slots 315. A base station 105 may transmit one or more multicast transmissions during the slots as described with reference to FIGS. 1 and 2. In some cases, the base station 105 may configure one or more PDCCH search space sets 510, each search space set 510 associated with a transmit beam 205 corresponding to an SSB for monitoring for an MCCH, an MTCH, or both. For example, search space set 510-*a*, search space set 510-*b*, and search space set 510-*c* may be associated with transmit beam 205-*a*, transmit beam 205-*b*, and transmit bema 205-*c* respectively. Each transmit beam 205 may correspond to a different SSB. Thus, there may be a one-to-one mapping between a search space set 510, which may be associated with a PDCCH, and a transmitted SSB.

In some cases, the search space sets 510 for a different SSBs may be associated with the same control resource set (CORESET). Alternatively, the search space sets 510 for different SSBs may be associated with different CORESETs. If the CORESET is the same for the search space sets 510, the search space sets 510 may not overlap in time (e.g., they may be in different slots of the radio frame 515). The search space set 510 configuration may reduce latency in a wireless communications system among other benefits (e.g., because the UE 115 may not wait for a next scheduling period to transmit an MCCH, an MTCH, or both using a different transmit beam 205).

Figure 6:
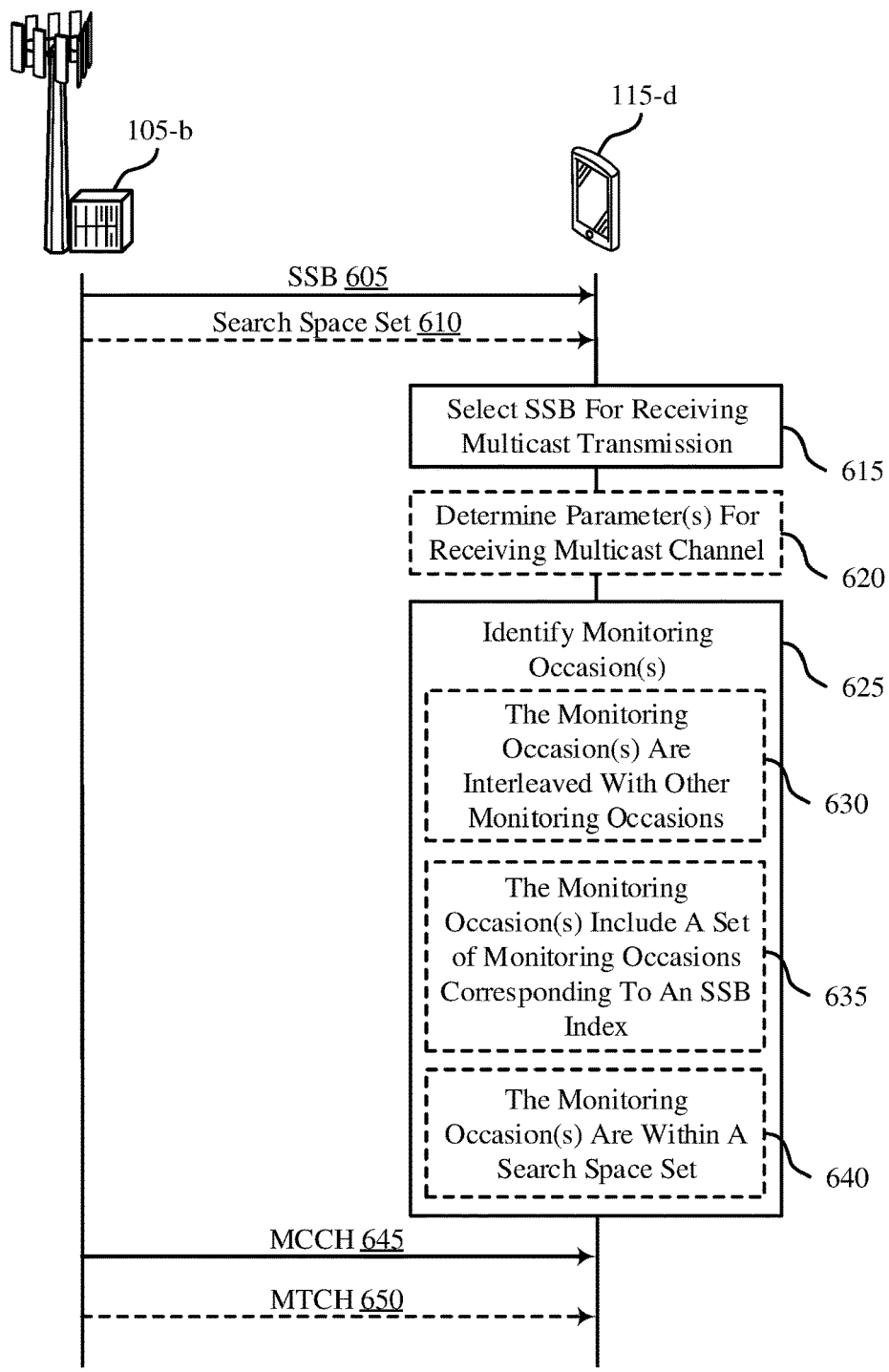
FIG. 6 illustrates an example of a process flow that supports synchronization signal based multicast transmission in accordance with aspects of the present disclosure.

FIG. 6 illustrates an example of a process flow 600 that supports synchronization signal based multicast transmission in accordance with aspects of the present disclosure. In some examples, process flow 600 may implement aspects of wireless communications systems 100 and 200. The process flow 400 may illustrate an example of a UE 115, such as UE 115-*d*, selecting an SSB for receiving a SIB and subsequently monitoring for a multicast channel (e.g., an MCCH or an MTCH) from a base station 105, such as base station 105-*b*. Alternative examples of the following may be implemented, where some processes are performed in a different order than described or are not performed. In some cases, processes may include additional features not mentioned below, or further processes may be added.

At 605, base station 105-*b* may transmit one or more SSBs to one or more UEs 115 including UE 115-*d*, each SSB including a multicast transmission. In some cases, base station 105-*b* may transmit a downlink control channel (e.g., a PDCCH) for scheduling a multicast transmission during one or more monitoring occasions.

At 610, base station 105-*b* may transmit an indication of one or more search space sets to UE 115-*d*. In some cases, the search space sets may overlap in time and may be associated with the same CORESET. In some other cases, the search space sets may be associated with different CORESETs.

At 615, UE 115-*d* may select an SSB for receiving the multicast transmission from base station 105-*b*. In some cases, the SSB may have a corresponding SSB index. In some cases, each monitoring occasion may correspond to an SSB index.

At 620, UE 115-*d* may receive a downlink control channel (e.g., a PDCCH) scheduling a multicast transmission (e.g., via a multicast channel) during one or more monitoring occasions. In some cases, UE 115-*d* may receive a SIB including one or more parameters for receiving the multicast channel (e.g., an MCCH or an MTCH). In some examples, the one or more parameters include an offset, a repletion period, a first subframe, a duration, a modification period, or a combination associated with the multicast channel. At 625, UE 115-*d* may identify one or more monitoring occasions for monitoring the multicast channel based on the SSB index.

At 630, UE 115-*d* may identify the one or more monitoring occasions correspond to the SSB index. In some cases, the one or more monitoring occasions may be interleaved with other monitoring occasions corresponding to other SSB indices. In some examples, the monitoring occasions (e.g., the one or more monitoring occasions and the other monitoring occasions) may be organized into sets, each set including one monitoring occasion per SSB index. In some cases, the sets may be organized sequentially by SSB index.

At 635, UE 115-*d* may identify the one or more monitoring occasions include a set of monitoring occasions corresponding to the SSB index and other sets of monitoring occasions correspond to other SSB indices. In some cases, each set may correspond to a respective period for receiving multicast transmissions. For example, each set may correspond to an MCCH repetition period, a DRX scheduling period for an MTCH, or both.

At 640, UE 115-*d* may identify the one or more monitoring occasions are within a search space set corresponding to the SSB index and the other sets of monitoring occasions are within other search space sets corresponding to other SSB indices. In some cases, the search space sets may be within a radio frame and may include any number of symbols.

At 645, UE 115-*d* may receive the multicast transmission (e.g., on an MCCH) from base station 105-*b* in accordance with the one or more parameters and during at least one of the one or more monitoring occasions. In some cases, UE 115-*d* may receive a downlink control channel (e.g., a PDCCH) for scheduling the MCCH during the one or more occasions with a MCCH repetition period, a DRX scheduling period for a MCCH, or both.

At 650, UE 115-*d* may receive a multicast transmission (e.g., on an MTCH) from base station 105-*b* based on receiving the MCCH. In some cases, UE 115-*d* may receive the MTCH, the MCCH, or both via a wide beam associated with an SSB. In some other cases, UE 115-*d* may receive the MTCH, via a narrow beam associated with a CSI-RS. In some examples, the CSI-RS may be configured as a QCL reference for the MTCH.

Figure 7:
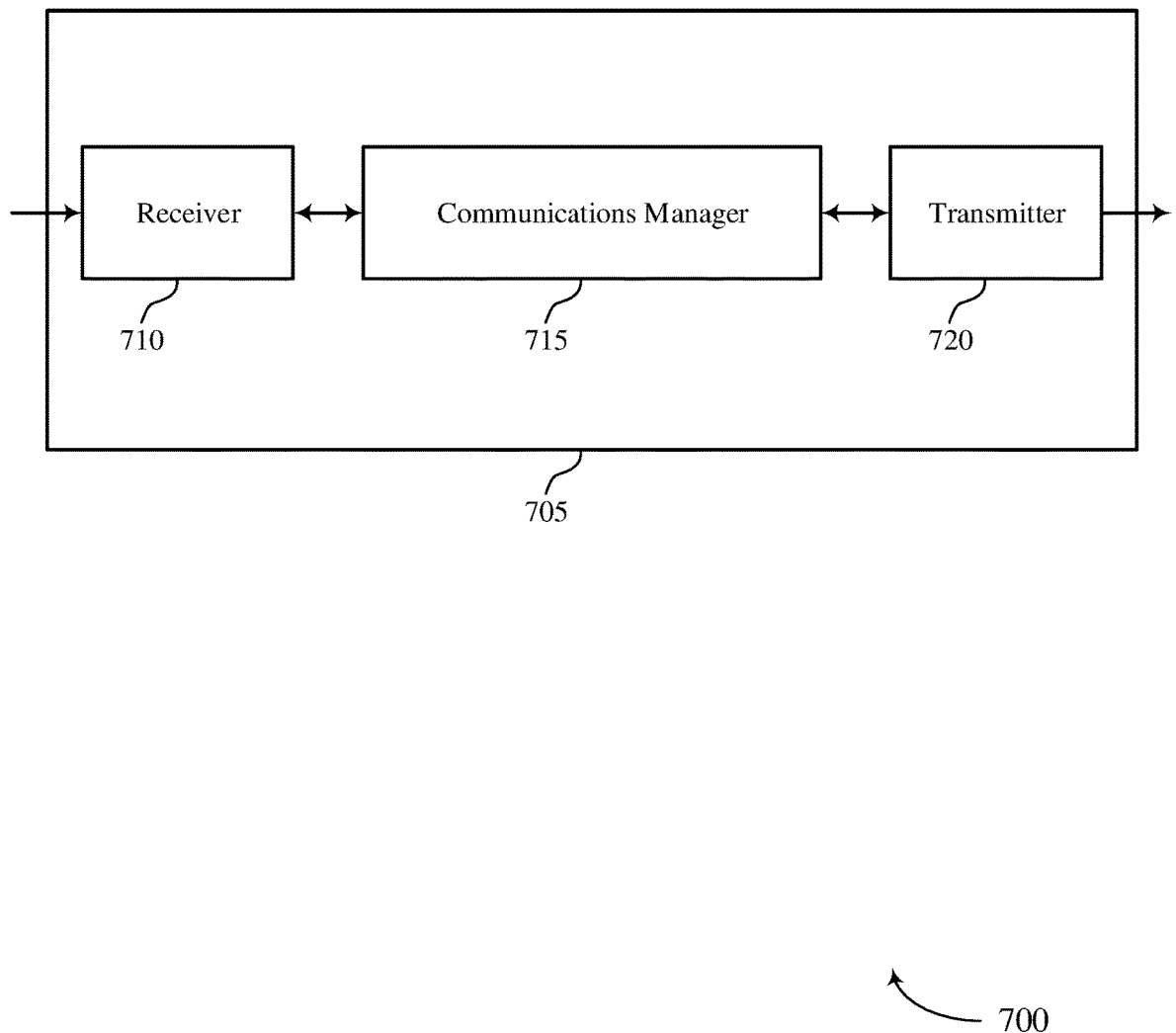
FIGS. 7 and 8 show block diagrams of devices that support synchronization signal based multicast transmission in accordance with aspects of the present disclosure.

FIG. 7 shows a block diagram 700 of a device 705 that supports synchronization signal based multicast transmission in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to synchronization signal based multicast transmission, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may select an SSB for receiving, from a base station, a multicast transmission, the SSB having a corresponding SSB index, identify one or more monitoring occasions for monitoring of a downlink control channel for scheduling multicast transmissions based on the SSB index, and receive the multicast transmission in accordance with the downlink control channel and during the one or more monitoring occasions. The communications manager 715 may be an example of aspects of the communications manager 1010 described herein.

The actions performed by the communications manager 715 as described herein may be implemented to realize one or more potential advantages. One implementation may enable a UE to select an SSB for receiving, from a base station, a multicast transmission. The UE may select an SSB with a relatively high signal quality, which may result in reduced signaling overhead at the UE, among other advantages.

Based on implementing the SSB selection as described herein, a processor of a UE or base station (e.g., a processor controlling the receiver 710, the communications manager 715, the transmitter 720, or a combination thereof) may reduce the impact or likelihood of unnecessary monitoring while ensuring relatively efficient communications. For example, the SSB selection techniques described herein may leverage an SSB index as well as monitoring occasion configurations to reduce the amount of time the UE waits for a multicast transmission, which may realize power savings at the UE, among other benefits.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signaling processor (DSP), an application-specific integrated circuit (ASIC), a field-programmable gate-array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
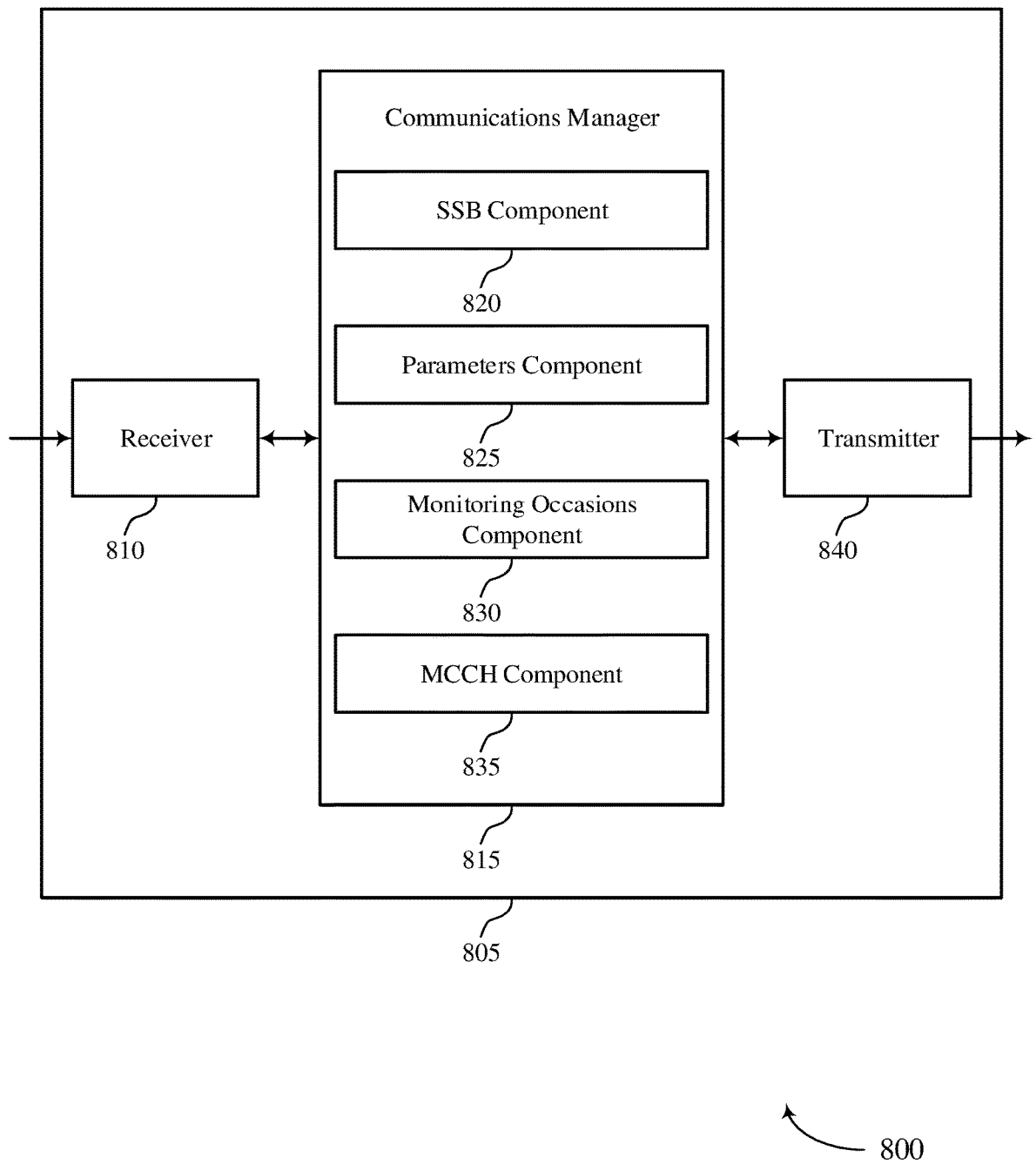

FIG. 8 shows a block diagram 800 of a device 805 that supports synchronization signal based multicast transmission in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to synchronization signal based multicast transmission, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include an SSB component 820, a parameters component 825, a monitoring occasions component 830, and an MCCH component 835. The communications manager 815 may be an example of aspects of the communications manager 1010 described herein.

The SSB component 820 may select an SSB for receiving, from a base station, a multicast transmission, the SSB having a corresponding SSB index. Additionally or alternatively, the SSB may correspond to a SIB. The parameters component 825 may determine, from the SIB, one or more parameters for receiving a multicast transmission. The monitoring occasions component 830 may identify one or more monitoring occasions for monitoring of a downlink control channel for scheduling multicast transmissions based on the SSB index. The MCCH component 835 may receive the multicast transmission in accordance with the downlink control channel and during the one or more monitoring occasions. In some cases, the multicast transmission may include a MCCH, an MTCH, or both.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
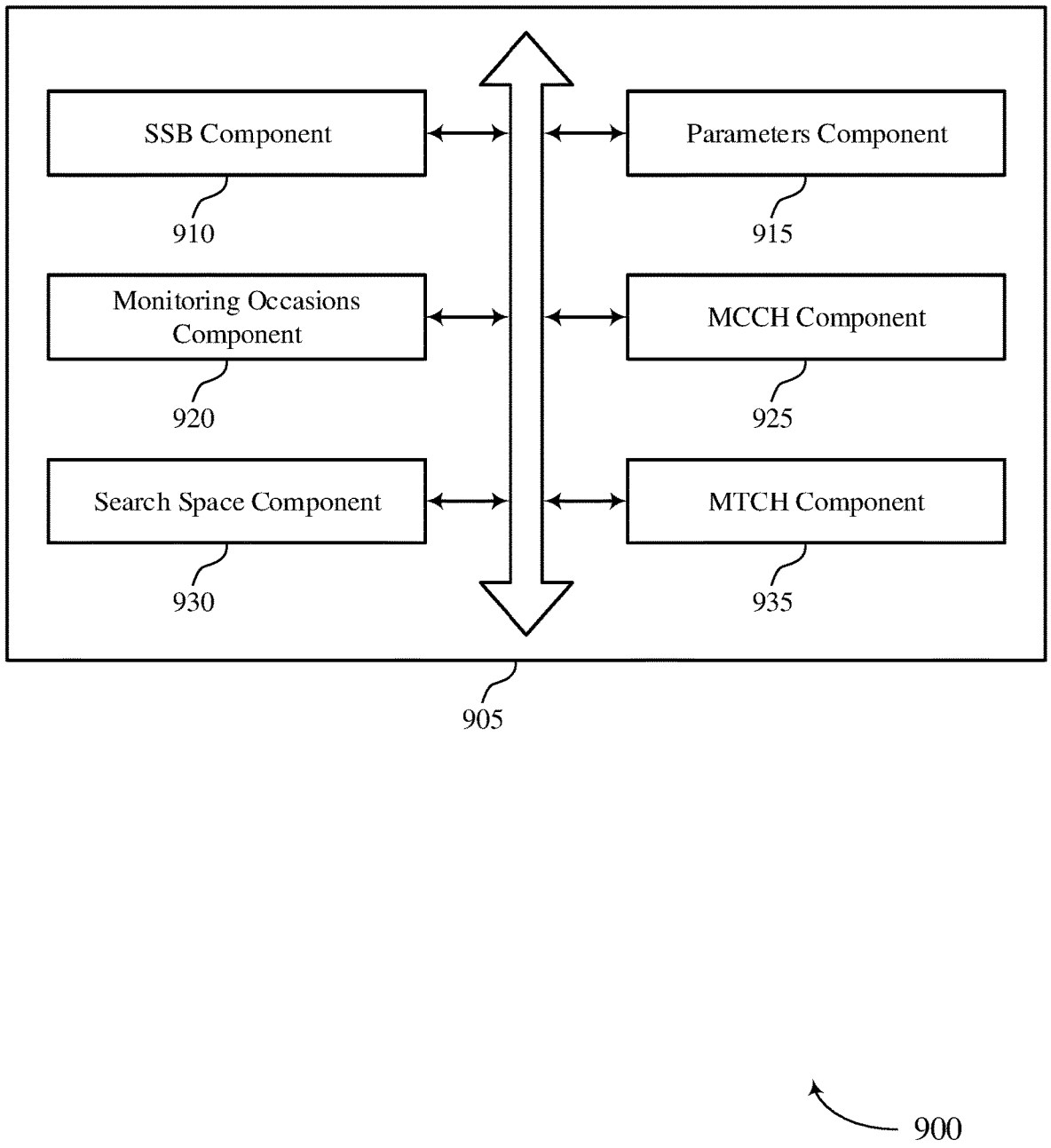
FIG. 9 shows a block diagram of a communications manager that supports synchronization signal based multicast transmission in accordance with aspects of the present disclosure.

FIG. 9 shows a block diagram 900 of a communications manager 905 that supports synchronization signal based multicast transmission in accordance with aspects of the present disclosure. The communications manager 905 may be an example of aspects of a communications manager 715, a communications manager 815, or a communications manager 1010 described herein. The communications manager 905 may include an SSB component 910, a parameters component 915, a monitoring occasions component 920, an MCCH component 925, a search space component 930, and an MTCH component 935. Each of these modules may communicate, directly or indirectly, with one another (e.g., via one or more buses).

The SSB component 910 may select an SSB for receiving, from a base station, a multicast transmission, the SSB having a corresponding SSB index. Additionally or alternatively, the SSB may correspond to a SIB. The parameters component 915 may determine, from the SIB, one or more parameters for receiving an MCCH. In some cases, the one or more parameters includes an offset, a repetition period, a first subframe, a duration, a modification period, or a combination thereof associated with the MCCH.

The monitoring occasions component 920 may identify one or more monitoring occasions for monitoring of a downlink control channel for scheduling multicast transmissions based on the SSB index. In some examples, the monitoring occasions component 920 may identify that the one or more monitoring occasions correspond to the SSB index, where the one or more monitoring occasions are interleaved with other monitoring occasions corresponding to other SSB indices, the one or more monitoring occasions and the other monitoring occasions being organized into sets of monitoring occasions, each set including one monitoring occasion per SSB index and organized sequentially by SSB index. In some examples, the monitoring occasions component 920 may identify that the one or more monitoring occasions include a first set of monitoring occasions corresponding to the SSB index, where other sets of monitoring occasions correspond to other SSB indices, each set also corresponding to a respective period for receiving multicast transmissions. In some cases, the respective periods for receiving multicast transmissions include respective MCCH repetition periods, respective DRX scheduling periods for an MTCH, or both.

In some examples, the monitoring occasions component 920 may identify that the one or more monitoring occasions are within a first search space set corresponding to the SSB index, where other sets of monitoring occasions are within other search space sets corresponding to other SSB indices. The search space component 930 may receive, from the base station, an indication of the first search space set and the other search space sets. In some cases, the first search space set and the other search space sets do not overlap in time and are associated with the same CORESET. In some other cases, the first search space set and the other search space sets are associated with different CORESETs.

In some examples, the MCCH component 925 may receive a downlink control channel for scheduling the multicast transmission during the one or more monitoring occasions within an MCCH repetition period, a DRX scheduling period for an MCCH, or both. The MCCH component 925 may receive the multicast transmission in accordance with the downlink control channel and during the one or more monitoring occasions. In some cases, the multicast transmission may include an MCCH, an MTCH, or both.

The MTCH component 935 may receive, from the base station, an MTCH in accordance with the MCCH. In some examples, the MTCH component 935 may receive the MTCH via a wide beam associated with an SSB. In some examples, the MTCH component 935 may receive the MTCH via a narrow beam associated with a CSI-RS. In some cases, the CSI-RS is configured as a QCL reference for the MTCH.

Figure 10:
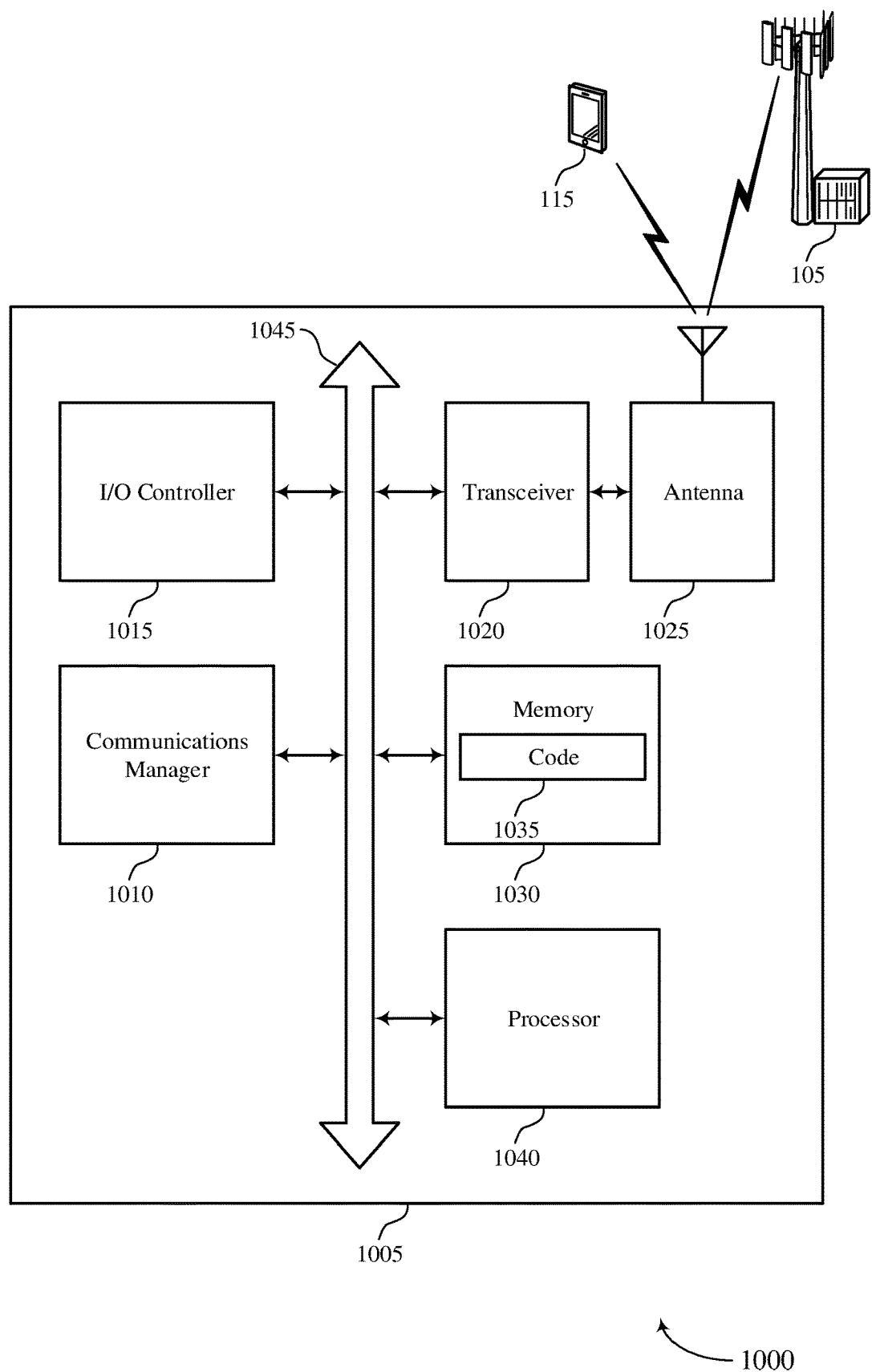
FIG. 10 shows a diagram of a system including a device that supports synchronization signal based multicast transmission in accordance with aspects of the present disclosure.

FIG. 10 shows a diagram of a system 1000 including a device 1005 that supports synchronization signal based multicast transmission in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may select an SSB for receiving, from a base station, a multicast transmission, the SSB having a corresponding SSB index, identify one or more monitoring occasions for monitoring of a downlink control channel for scheduling multicast transmissions based on the SSB index, and receive the multicast transmission in accordance with the downlink control channel and during the one or more monitoring occasions.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting synchronization signal based multicast transmission).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
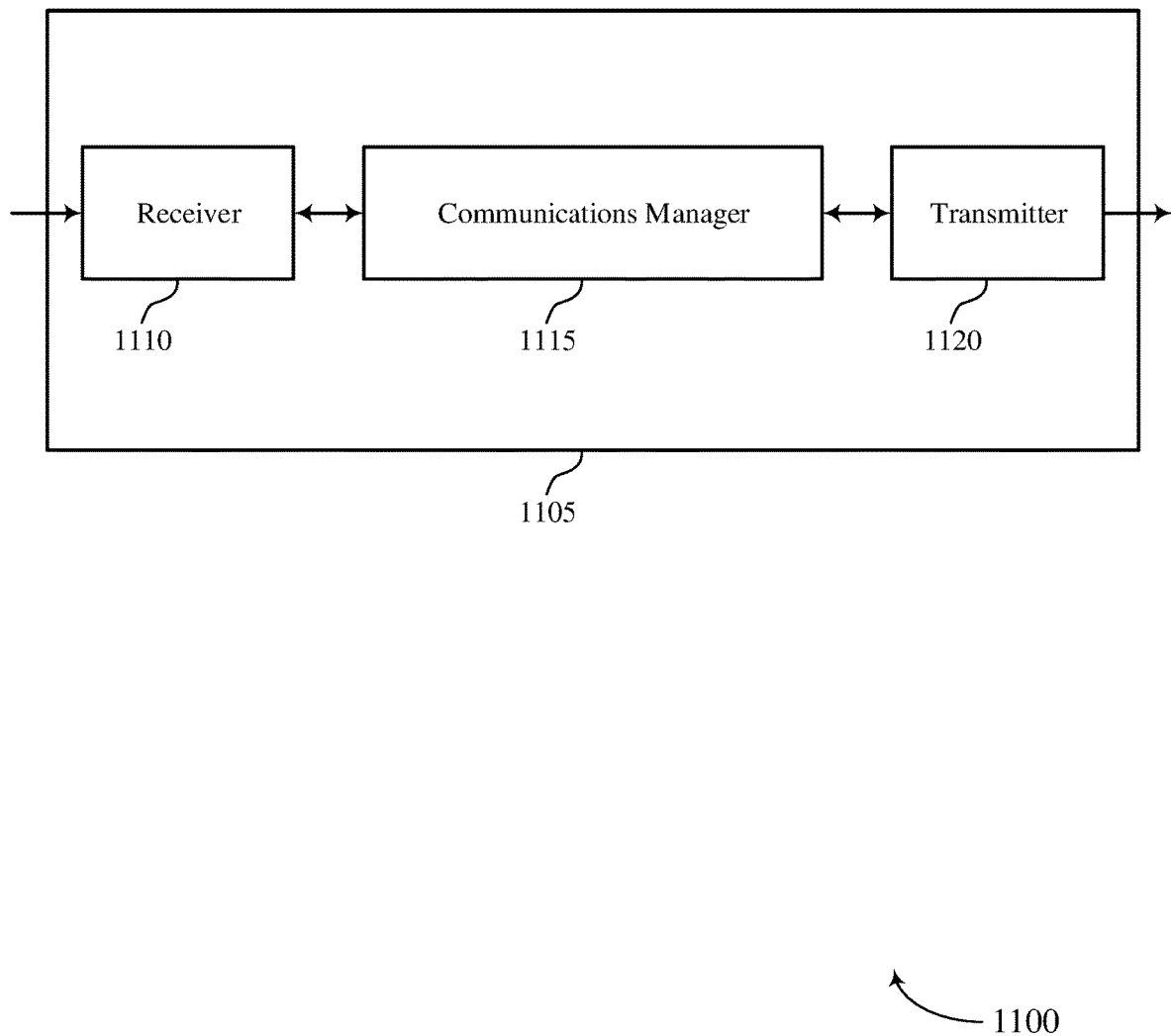
FIGS. 11 and 12 show block diagrams of devices that support synchronization signal based multicast transmission in accordance with aspects of the present disclosure.

FIG. 11 shows a block diagram 1100 of a device 1105 that supports synchronization signal based multicast transmission in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to synchronization signal based multicast transmission, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit multiple SSBs, each of the multiple SSBs including a multicast transmission to be received by a UE, and may transmit a downlink control channel for scheduling the multicast transmission during one or more monitoring occasions to the UE, where different ones of the one or more monitoring occasions are associated with different ones of the multiple SSBs such that each of the one or more monitoring occasions is associated with a corresponding SSB index. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
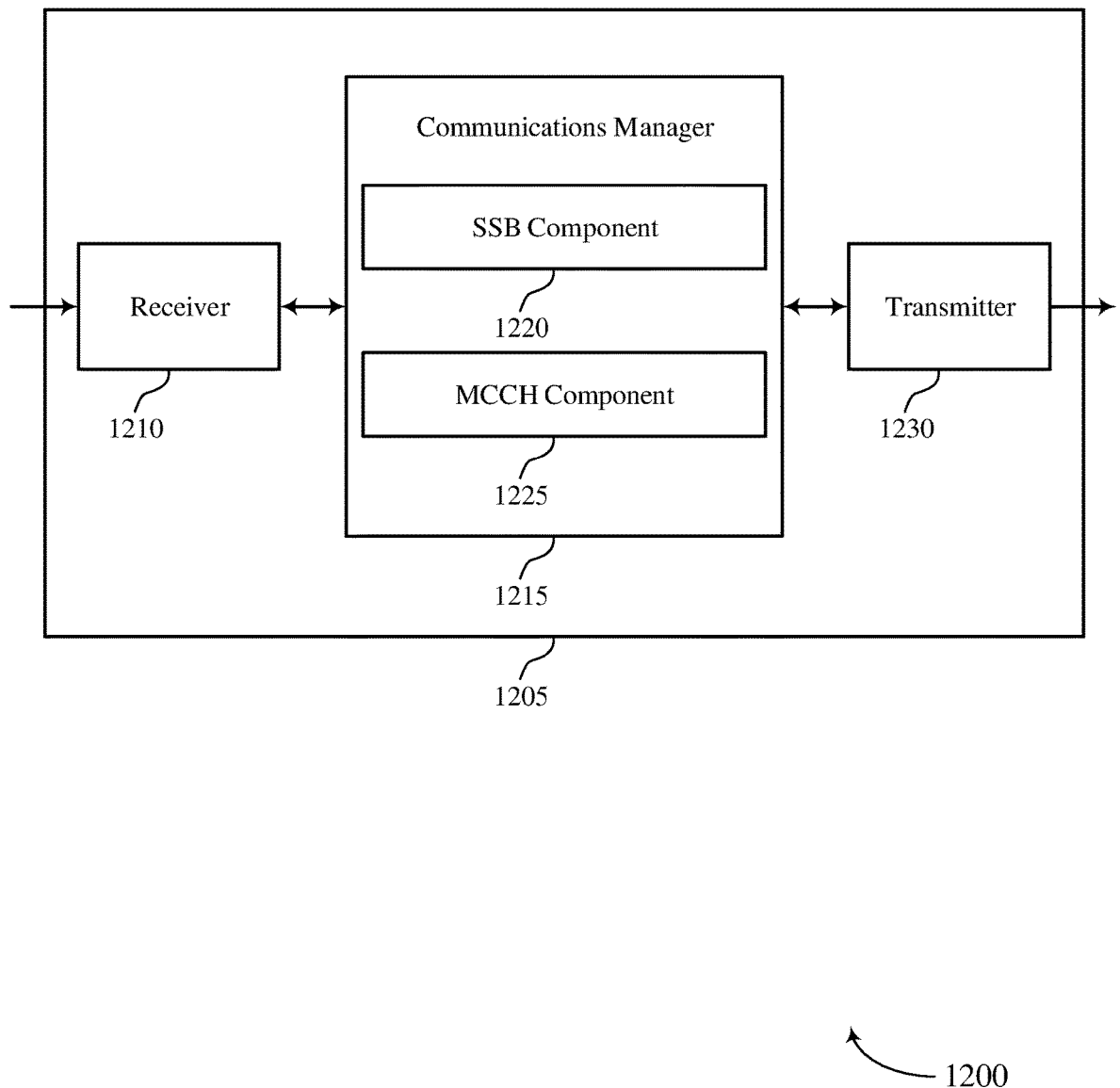

FIG. 12 shows a block diagram 1200 of a device 1205 that supports synchronization signal based multicast transmission in accordance with aspects of the present disclosure. The device 1205 may be an example of aspects of a device 1105, or a base station 105 as described herein. The device 1205 may include a receiver 1210, a communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to synchronization signal based multicast transmission, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include an SSB component 1220 and an MCCH component 1225. The communications manager 1215 may be an example of aspects of the communications manager 1410 described herein.

The SSB component 1220 may transmit multiple SSBs, each of the multiple SSBs including a multicast transmission to be received by a UE. The MCCH component 1225 may transmit a downlink control channel for scheduling the multicast transmission during one or more monitoring occasions to the UE, where different ones of the one or more monitoring occasions are associated with different ones of the multiple SSBs such that each of the one or more monitoring occasions is associated with a corresponding SSB index.

The transmitter 1230 may transmit signals generated by other components of the device 1205. In some examples, the transmitter 1230 may be collocated with a receiver 1210 in a transceiver module. For example, the transmitter 1230 may be an example of aspects of the transceiver 1420 described with reference to FIG. 14. The transmitter 1230 may utilize a single antenna or a set of antennas.

Figure 13:
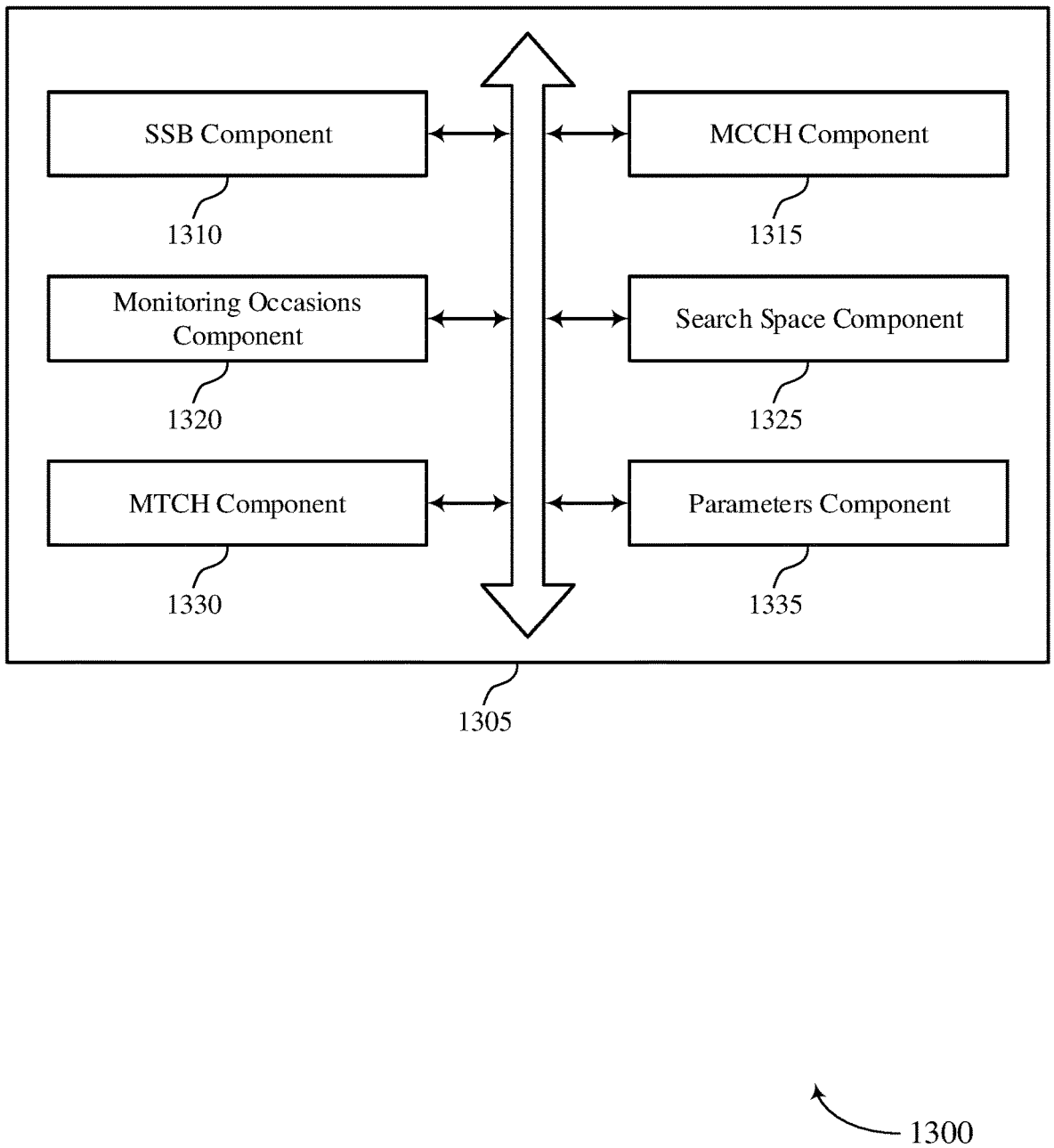
FIG. 13 shows a block diagram of a communications manager that supports synchronization signal based multicast transmission in accordance with aspects of the present disclosure.

FIG. 13 shows a block diagram 1300 of a communications manager 1305 that supports synchronization signal based multicast transmission in accordance with aspects of the present disclosure. The communications manager 1305 may be an example of aspects of a communications manager 1115, a communications manager 1215, or a communications manager 1410 described herein. The communications manager 1305 may include an SSB component 1310, an MCCH component 1315, a monitoring occasions component 1320, a search space component 1325, an MTCH component 1330, and a parameters component 1335. Each of these modules may communicate, directly or indirectly, with one another (e.g., via one or more buses).

The SSB component 1310 may transmit multiple SSBs, each of the multiple SSBs including a multicast transmission to be received by a UE. The MCCH component 1315 may transmit a downlink control channel for scheduling the multicast transmission during one or more monitoring occasions to the UE, where different ones of the one or more monitoring occasions are associated with different ones of the multiple SSBs such that each of the one or more monitoring occasions is associated with a corresponding SSB index.

In some examples, the monitoring occasions component 1320 may transmit the multicast transmission during a downlink control channel scheduling the one or more monitoring occasions within an MCCH repetition period, a DRX scheduling period for an MCCH, or both. In some cases, the multicast transmission may include an MCCH, an MTCH, or both. In some cases, each SSB may correspond to a SIB.

In some cases, the one or more monitoring occasions are organized into sets of monitoring occasions, each set including one monitoring occasion per SSB index and organized sequentially by SSB index.

In some cases, the one or more monitoring occasions are organized into sets of monitoring occasions based on SSB index, each set also corresponding to a respective period for transmitting multicast transmissions. In some cases, the respective periods for transmitting multicast transmissions include respective MCCH repetition periods, respective DRX scheduling periods for an MCCH, or both.

In some cases, the one or more monitoring occasions are organized into search space sets based on SSB index. The search space component 1325 may transmit, to the UE, an indication of the search space sets. In some cases, the search space sets do not overlap in time and are associated with the same CORESET. In some other cases, the search space sets are associated with different CORESETs.

The MTCH component 1330 may transmit, to the UE, an MTCH in accordance with the MCCH. In some examples, the MTCH component 1330 may transmit the MTCH via a wide beam associated with an SSB. In some examples, the MTCH component 1330 may transmit the MTCH via a narrow beam associated with a CSI-RS. In some cases, the CSI-RS is configured as a quasi-collocation reference for the MTCH.

The parameters component 1335 may identify each SIB includes the one or more parameters. In some cases, the one or more parameters includes an offset, a repetition period, a first subframe, a duration, a modification period, or a combination thereof associated with the MCCH.

Figure 14:
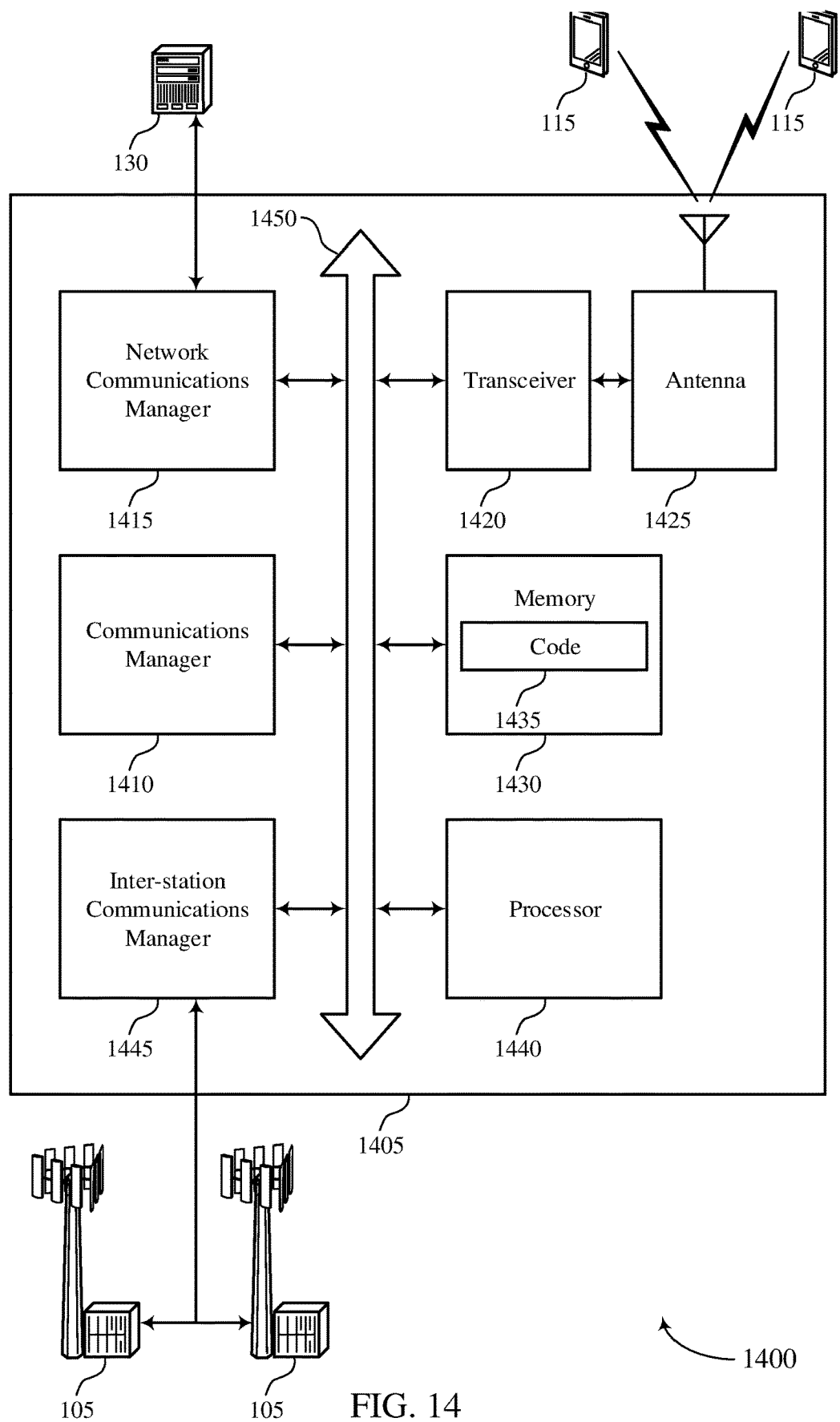
FIG. 14 shows a diagram of a system including a device that supports synchronization signal based multicast transmission in accordance with aspects of the present disclosure.

FIG. 14 shows a diagram of a system 1400 including a device 1405 that supports synchronization signal based multicast transmission in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit multiple SSBs, each of the multiple SSBs including a multicast transmission to be received by a UE, and may transmit a downlink control channel for scheduling the multicast transmission during one or more monitoring occasions to the UE, where different ones of the one or more monitoring occasions are associated with different ones of the multiple SSBs such that each of the one or more monitoring occasions is associated with a corresponding SSB index.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting synchronization signal based multicast transmission).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
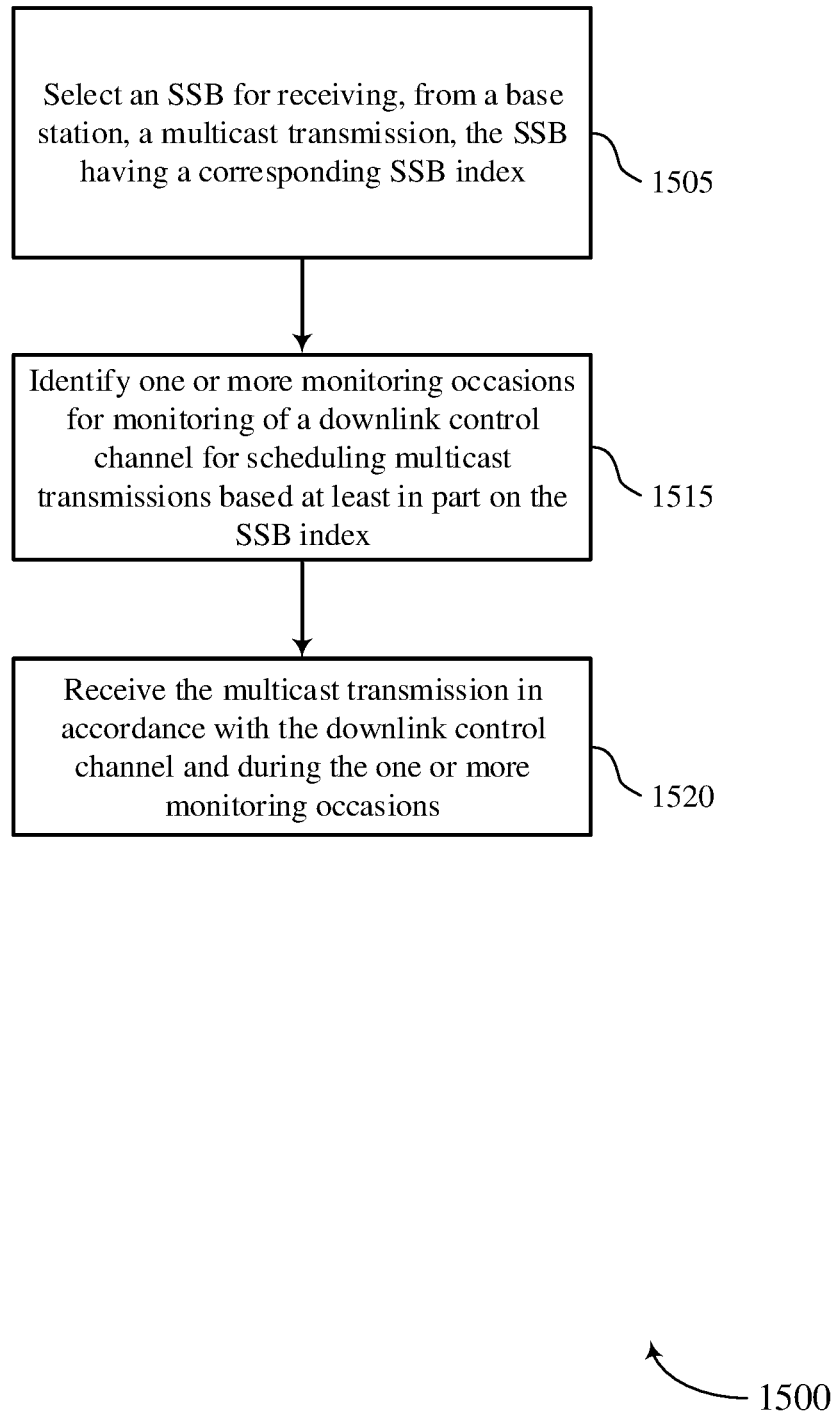
FIGS. 15 through 18 show flowcharts illustrating methods that support synchronization signal based multicast transmission in accordance with aspects of the present disclosure.

FIG. 15 shows a flowchart illustrating a method 1500 that supports synchronization signal based multicast transmission in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may select an SSB for receiving, from a base station, a multicast transmission, the SSB having a corresponding SSB index. In some cases, the SSB may correspond to a SIB. In some cases, the UE may determine, from the SIB, one or more parameters for receiving a multicast transmission. The operations of 1505 may be performed according to the methods described herein. In some examples, aspects of the operations of 1505 may be performed by an SSB component as described with reference to FIGS. 7 through 10.

At 1515, the UE may identify one or more monitoring occasions for monitoring of a downlink control channel for scheduling multicast transmissions based at least in part on the SSB index. The operations of 1515 may be performed according to the methods described herein. In some examples, aspects of the operations of 1515 may be performed by a monitoring occasions component as described with reference to FIGS. 7 through 10.

At 1520, the UE may receive the multicast transmission in accordance with the downlink control channel and during the one or more monitoring occasions. The operations of 1520 may be performed according to the methods described herein. In some examples, aspects of the operations of 1520 may be performed by an MCCH component as described with reference to FIGS. 7 through 10.

Figure 16:
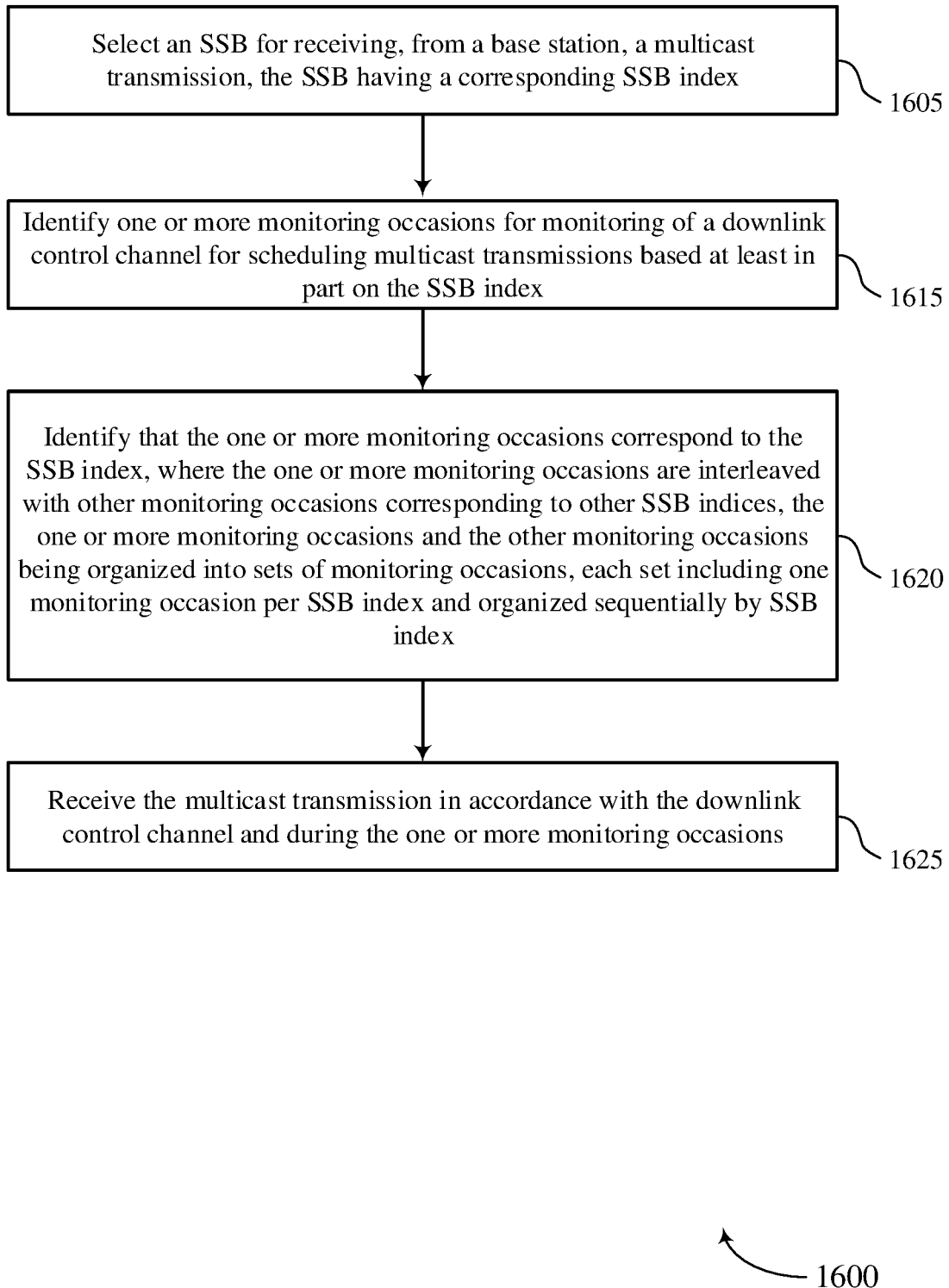

FIG. 16 shows a flowchart illustrating a method 1600 that supports synchronization signal based multicast transmission in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may select an SSB for receiving, from a base station, a multicast transmission, the SSB having a corresponding SSB index. In some cases, the SSB may correspond to a SIB. In some cases, the UE may determine, from the SIB, one or more parameters for receiving a multicast transmission. The operations of 1605 may be performed according to the methods described herein. In some examples, aspects of the operations of 1605 may be performed by an SSB component as described with reference to FIGS. 7 through 10.

At 1615, the UE may identify one or more monitoring occasions for monitoring of a downlink control channel for scheduling multicast transmissions based at least in part on the SSB index. The operations of 1615 may be performed according to the methods described herein. In some examples, aspects of the operations of 1615 may be performed by a monitoring occasions component as described with reference to FIGS. 7 through 10.

At 1620, the UE may identify that the one or more monitoring occasions correspond to the SSB index, where the one or more monitoring occasions are interleaved with other monitoring occasions corresponding to other SSB indices, the one or more monitoring occasions and the other monitoring occasions being organized into sets of monitoring occasions, each set including one monitoring occasion per SSB index and organized sequentially by SSB index. The operations of 1620 may be performed according to the methods described herein. In some examples, aspects of the operations of 1620 may be performed by a monitoring occasions component as described with reference to FIGS. 7 through 10.

At 1625, the UE may receive the multicast transmission in accordance with the downlink control channel and during the one or more monitoring occasions. The operations of 1625 may be performed according to the methods described herein. In some examples, aspects of the operations of 1625 may be performed by an MCCH component as described with reference to FIGS. 7 through 10.

Figure 17:
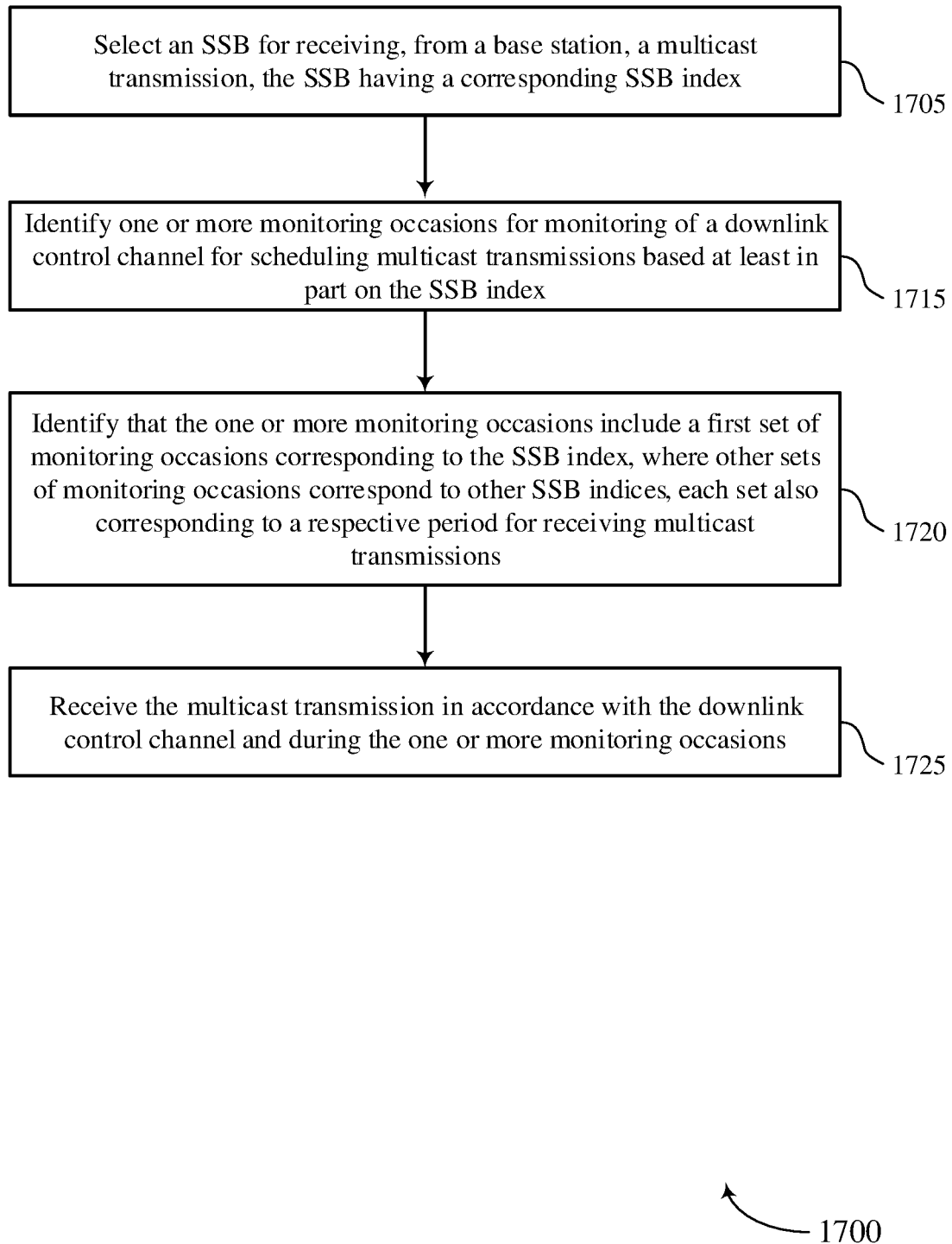

FIG. 17 shows a flowchart illustrating a method 1700 that supports synchronization signal based multicast transmission in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may select an SSB for receiving, from a base station, a multicast transmission, the SSB having a corresponding SSB index. In some cases, the SSB may correspond to a SIB. In some cases, the UE may determine, from the SIB, one or more parameters for receiving a multicast transmission. The operations of 1705 may be performed according to the methods described herein. In some examples, aspects of the operations of 1705 may be performed by an SSB component as described with reference to FIGS. 7 through 10.

At 1715, the UE may identify one or more monitoring occasions for monitoring of a downlink control channel for scheduling multicast transmissions based at least in part on the SSB index. The operations of 1715 may be performed according to the methods described herein. In some examples, aspects of the operations of 1715 may be performed by a monitoring occasions component as described with reference to FIGS. 7 through 10.

At 1720, the UE may identify that the one or more monitoring occasions include a first set of monitoring occasions corresponding to the SSB index, where other sets of monitoring occasions correspond to other SSB indices, each set also corresponding to a respective period for receiving multicast transmissions. The operations of 1720 may be performed according to the methods described herein. In some examples, aspects of the operations of 1720 may be performed by a monitoring occasions component as described with reference to FIGS. 7 through 10.

At 1725, the UE may receive the multicast transmission in accordance with the downlink control channel and during the one or more monitoring occasions. The operations of 1725 may be performed according to the methods described herein. In some examples, aspects of the operations of 1725 may be performed by an MCCH component as described with reference to FIGS. 7 through 10.

Figure 18:
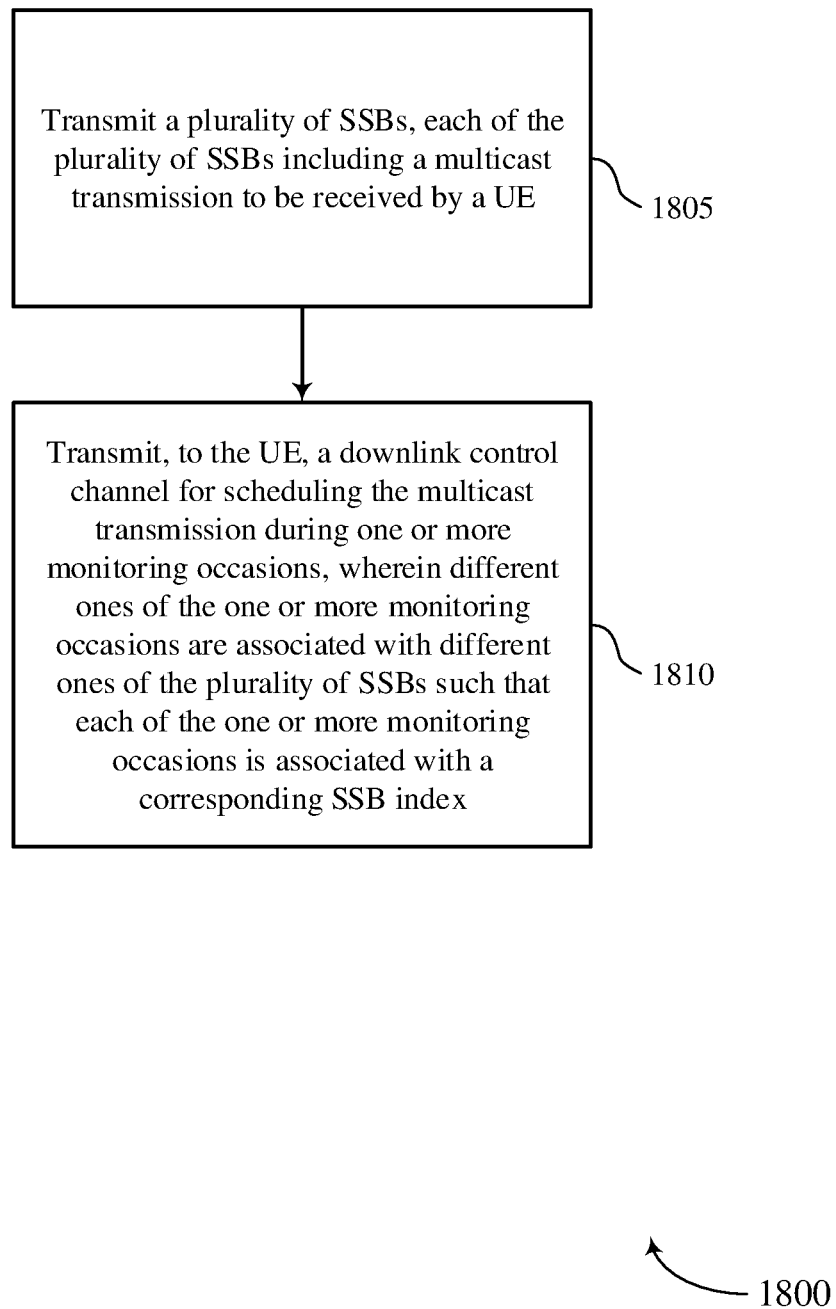

FIG. 18 shows a flowchart illustrating a method 1800 that supports synchronization signal based multicast transmission in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may transmit multiple SSBs, each of the multiple SSBs including a multicast transmission to be received by a UE. The operations of 1805 may be performed according to the methods described herein. In some examples, aspects of the operations of 1805 may be performed by an SSB component as described with reference to FIGS. 11 through 14.

At 1810, the base station may transmit a downlink control channel for scheduling the multicast transmission during one or more monitoring occasions to the UE, where different ones of the one or more monitoring occasions are associated with different ones of the multiple SSBs such that each of the one or more monitoring occasions is associated with a corresponding SSB index. The operations of 1810 may be performed according to the methods described herein. In some examples, aspects of the operations of 1810 may be performed by an MCCH component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Example 1: A method for wireless communications at a UE, comprising: selecting a synchronization signal block for receiving, from a base station, a multicast transmission, the synchronization signal block having a corresponding synchronization signal block index; identifying one or more monitoring occasions for monitoring of a downlink control channel for scheduling multicast transmissions based at least in part on the synchronization signal block index; and receiving the multicast transmission in accordance with the downlink control channel and during the one or more monitoring occasions.

Example 2: The method of example 1, wherein receiving the multicast transmission comprises: receiving, from the base station, a multicast control channel, a multicast traffic channel, or both.

Example 3: The method of example 2, wherein receiving the multicast traffic channel comprises: receiving the multicast traffic channel via a narrow beam associated with a channel state information-reference signal.

Example 4: The method of example 3, wherein the channel state information-reference signal is configured as a quasi-collocation reference for the multicast traffic channel.

Example 5: The method of any of examples 1 to 4, wherein identifying the one or more monitoring occasions comprises: identifying that the one or more monitoring occasions correspond to the synchronization signal block index, wherein the one or more monitoring occasions are interleaved with other monitoring occasions corresponding to other synchronization signal block indices, the one or more monitoring occasions and the other monitoring occasions being organized into sets of monitoring occasions, each set including one monitoring occasion per synchronization signal block index and organized sequentially by synchronization signal block index.

Example 6: The method of any of examples 1 to 4, wherein identifying the one or more monitoring occasions comprises: identifying that the one or more monitoring occasions comprise a first set of monitoring occasions corresponding to the synchronization signal block index, wherein other sets of monitoring occasions correspond to other synchronization signal block indices, each set also corresponding to a respective period for receiving the multicast transmissions.

Example 7: The method of example 6, wherein the respective periods for receiving the multicast transmissions include respective multicast control channel repetition periods, respective discontinuous reception scheduling periods for a multicast traffic channel, or both.

Example 8: The method of any of examples 1 to 4, wherein identifying the one or more monitoring occasions comprises: identifying that the one or more monitoring occasions are within a first search space set corresponding to the synchronization signal block index, wherein other sets of monitoring occasions are within other search space sets corresponding to other synchronization signal block indices.

Example 9: The method of example 8, further comprising: receiving, from the base station, an indication of the first search space set and the other search space sets.

Example 10: The method of examples 8 or 9, wherein the first search space set and the other search space sets do not overlap in time and are associated with the same control resource set.

Example 11: The method of examples 8 or 9, wherein the first search space set and the other search space sets are associated with different control resource sets.

Example 12: A method for wireless communications at a base station, comprising: transmitting a plurality of synchronization signal blocks, each of the plurality of synchronization signal blocks including a multicast transmission to be received by a user equipment (UE); and transmitting, to the UE, a downlink control channel for scheduling the multicast transmission during one or more monitoring occasions, wherein different ones of the one or more monitoring occasions are associated with different ones of the plurality of synchronization signal blocks such that each of the one or more monitoring occasions is associated with a corresponding synchronization signal block index.

Example 13: The method of example 12, wherein the one or more monitoring occasions are organized into sets of monitoring occasions, each set including one monitoring occasion per synchronization signal block index and organized sequentially by synchronization signal block index.

Example 14: The method of example 12, wherein the one or more monitoring occasions are organized into sets of monitoring occasions based on synchronization signal block index, each set also corresponding to a respective period for transmitting multicast transmissions.

Example 15: The method of example 14, wherein the respective periods for transmitting the multicast transmissions include respective multicast control channel repetition periods, respective discontinuous reception scheduling periods for a multicast traffic channel, or both.

Example 16: The method of example 12, wherein the one or more monitoring occasions are organized into search space sets based on synchronization signal block index.

Example 17: The method of example 16, further comprising: transmitting, to the UE, an indication of the search space sets.

Example 18: The method of examples 16 or 17, wherein the search space sets do not overlap in time and are associated with the same control resource set.

Example 19: The method of examples 16 or 17, wherein the search space sets are associated with different control resource sets.

Example 20: The method of any of examples 12 to 19, wherein transmitting the multicast transmission comprises: transmitting, to the UE, a multicast control channel, a multicast traffic channel, or both.

Example 21: The method of example 20, wherein transmitting the multicast traffic channel comprises: transmitting the multicast traffic channel via a narrow beam associated with a channel state information-reference signal.

Example 22: The method of example 21, wherein the channel state information-reference signal is configured as a quasi-collocation reference for the multicast traffic channel.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   selecting a synchronization signal block for receiving a multicast transmission, the synchronization signal block corresponding to a synchronization signal block index, wherein the multicast transmission comprises control information on a multicast control channel, multimedia broadcast multicast services data on a multicast traffic channel, or both;
   receiving a system information block comprising one or more parameters for receiving the multicast control channel, the multicast traffic channel, or both in accordance with the selected synchronization signal block;
   identifying one or more monitoring occasions for monitoring of a downlink control channel for scheduling multicast transmissions based at least in part on the synchronization signal block index; and receiving the multicast transmission in accordance with the downlink control channel, in accordance with the one or more parameters, and during the one or more monitoring occasions.

2. A method for wireless communications at a network device, comprising:

transmitting a plurality of synchronization signal blocks, each of the plurality of synchronization signal blocks corresponding to a multicast transmission to be received by a user equipment (UE), wherein the multicast transmission comprises control information on a multicast control channel, multimedia broadcast multicast services data on a multicast traffic channel, or both; and transmitting a downlink control channel for scheduling the multicast transmission during one or more monitoring occasions corresponding to the multicast transmission, wherein different ones of the one or more monitoring occasions are associated with different ones of the plurality of synchronization signal blocks such that each of the one or more monitoring occasions is associated with a corresponding synchronization signal block index, and wherein the one or more monitoring occasions corresponding to the multicast transmission are organized into sets of monitoring occasions, each set including one monitoring occasion per a respective synchronization signal block index and organized sequentially by the respective synchronization signal block index.

3. An apparatus for wireless communications at a user equipment (UE), comprising:

one or more processors, one or more memories coupled with the one or more processors; and instructions stored in the one or more memories and executable by the one or more processors to cause the apparatus to:

select a synchronization signal block for receiving a multicast transmission, the synchronization signal block corresponding to a synchronization signal block index, wherein the multicast transmission comprises control information on a multicast control channel, multimedia broadcast multicast services data on a multicast traffic channel, or both;

receive a system information block comprising one or more parameters for receiving the multicast control channel, the multicast traffic channel, or both in accordance with the selected synchronization signal block;

identify one or more monitoring occasions for monitoring of a downlink control channel for scheduling multicast transmissions based at least in part on the synchronization signal block index; and receive the multicast transmission in accordance with the downlink control channel, in accordance with the one or more parameters, and during the one or more monitoring occasions.

4. The apparatus of claim 3, wherein the instructions to receive the multicast transmission are executable by the one or more processors to cause the apparatus to:

receive the multicast control channel, the multicast traffic channel, or both.

5. The apparatus of claim 4, wherein the instructions to receive the multicast traffic channel are executable by the one or more processors to cause the apparatus to:

receive the multicast traffic channel via a narrow beam associated with a channel state information-reference signal.

6. The apparatus of claim 5, wherein the channel state information-reference signal is configured as a quasi-collocation reference for the multicast traffic channel.

7. The apparatus of claim 3, wherein the instructions to identify the one or more monitoring occasions are executable by the one or more processors to cause the apparatus to:

identify that the one or more monitoring occasions correspond to the synchronization signal block index, wherein the one or more monitoring occasions are interleaved with other monitoring occasions corresponding to other synchronization signal block indices, the one or more monitoring occasions and the other monitoring occasions being organized into sets of monitoring occasions, each set including one monitoring occasion per a respective synchronization signal block index and organized sequentially by the respective synchronization signal block index.

8. The apparatus of claim 3, wherein the instructions to identify the one or more monitoring occasions are executable by the one or more processors to cause the apparatus to:

identify that the one or more monitoring occasions comprise a first set of monitoring occasions corresponding to the synchronization signal block index, wherein other sets of monitoring occasions correspond to other synchronization signal block indices, each set also corresponding to a respective period for receiving the multicast transmissions.

9. The apparatus of claim 8, wherein the respective periods for receiving the multicast transmissions include respective multicast control channel repetition periods, respective discontinuous reception scheduling periods for the multicast traffic channel, or both.

10. The apparatus of claim 3, wherein the instructions to identify the one or more monitoring occasions are executable by the one or more processors to cause the apparatus to:

identify that the one or more monitoring occasions are within a first search space set corresponding to the synchronization signal block index, wherein other sets of monitoring occasions are within other search space sets corresponding to other synchronization signal block indices.

11. The apparatus of claim 10, wherein the instructions are further executable by the one or more processors to cause the apparatus to:

receive an indication of the first search space set and the other search space sets.

12. The apparatus of claim 10, wherein the first search space set and the other search space sets do not overlap in time and are associated with a same control resource set.

13. The apparatus of claim 10, wherein the first search space set and the other search space sets are associated with different control resource sets.

14. An apparatus for wireless communications at a network device, comprising:

one or more processors, one or more memories coupled with the one or more processors; and instructions stored in the one or more memories and executable by the one or more processors to cause the apparatus to:

transmit a plurality of synchronization signal blocks, each of the plurality of synchronization signal blocks corresponding to a multicast transmission to be received by a user equipment (UE), wherein the multicast transmission comprises control information on a multicast control channel, multimedia broadcast multicast services data on a multicast traffic channel, or both; and transmit a downlink control channel for scheduling the multicast transmission during one or more monitoring occasions corresponding to the multicast transmission, wherein different ones of the one or more monitoring occasions are associated with different ones of the plurality of synchronization signal blocks such that each of the one or more monitoring occasions is associated with a corresponding synchronization signal block index, and wherein the one or more monitoring occasions corresponding to the multicast transmission are organized into sets of monitoring occasions, each set including one monitoring occasion per a respective synchronization signal block index and organized sequentially by the respective synchronization signal block index.

15. The apparatus of claim 14, wherein the one or more monitoring occasions are organized into the sets of monitoring occasions based on synchronization signal block index, each set also corresponding to a respective period for transmitting multicast transmissions.

16. The apparatus of claim 15, wherein the respective periods for transmitting the multicast transmissions include a respective multicast control channel repetition period, a respective discontinuous reception scheduling period for the multicast traffic channel, or both.

17. The apparatus of claim 14, wherein the one or more monitoring occasions are organized into search space sets based on synchronization signal block index.

18. The apparatus of claim 17, wherein the instructions are further executable by the one or more processors to cause the apparatus to:
transmit an indication of the search space sets.

19. The apparatus of claim 17, wherein the search space sets do not overlap in time and are associated with a same control resource set.

20. The apparatus of claim 17, wherein the search space sets are associated with different control resource sets.

21. The apparatus of claim 14, wherein the instructions to transmit the multicast transmission are executable by the one or more processors to cause the apparatus to:
transmit the multicast control channel, the multicast traffic channel, or both.

22. The apparatus of claim 21, wherein the instructions to transmit the multicast traffic channel are executable by the one or more processors to cause the apparatus to:
transmit the multicast traffic channel via a narrow beam associated with a channel state information-reference signal.

23. The apparatus of claim 22, wherein the channel state information-reference signal is configured as a quasi-collocation reference for the multicast traffic channel.

24. An apparatus for wireless communications at a user equipment (UE), comprising:
means for selecting a synchronization signal block for receiving a multicast transmission, the synchronization signal block corresponding to a synchronization signal block index, wherein the multicast transmission comprises control information on a multicast control channel, multimedia broadcast multicast services data on a multicast traffic channel, or both;
means for receiving a system information block comprising one or more parameters for receiving the multicast control channel, the multicast traffic channel, or both in accordance with the selected synchronization signal block;
means for identifying one or more monitoring occasions for monitoring of a downlink control channel for scheduling multicast transmissions based at least in part on the synchronization signal block index; and
means for receiving the multicast transmission in accordance with the downlink control channel, in accordance with the one or more parameters, and during the one or more monitoring occasions.

25. An apparatus for wireless communications at a network device, comprising:
means for transmitting a plurality of synchronization signal blocks, each of the plurality of synchronization signal blocks corresponding to a multicast transmission to be received by a user equipment (UE), wherein the multicast transmission comprises control information on a multicast control channel, multimedia broadcast multicast services data on a multicast traffic channel, or both; and
means for transmitting a downlink control channel for scheduling the multicast transmission during one or more monitoring occasions corresponding to the multicast transmission, wherein different ones of the one or more monitoring occasions are associated with different ones of the plurality of synchronization signal blocks such that each of the one or more monitoring occasions is associated with a corresponding synchronization signal block index, and wherein the one or more monitoring occasions corresponding to the multicast transmission are organized into sets of monitoring occasions, each set including one monitoring occasion per a respective synchronization signal block index and organized sequentially by the respective synchronization signal block index.

26. A non-transitory computer-readable medium storing code for wireless communications at a user equipment (UE), the code comprising instructions executable by one or more processors to:
select a synchronization signal block for receiving a multicast transmission, the synchronization signal block corresponding to a synchronization signal block index, wherein the multicast transmission comprises control information on a multicast control channel, multimedia broadcast multicast services data on a multicast traffic channel, or both;
receive a system information block comprising one or more parameters for receiving the multicast control channel, the multicast traffic channel, or both in accordance with the selected synchronization signal block;
identify one or more monitoring occasions for monitoring of a downlink control channel for scheduling multicast transmissions based at least in part on the synchronization signal block index; and
receive the multicast transmission in accordance with the downlink control channel, in accordance with the one or more parameters, and during the one or more monitoring occasions.

27. A non-transitory computer-readable medium storing code for wireless communications at a network device, the code comprising instructions executable by one or more processors to:
transmit a plurality of synchronization signal blocks, each of the plurality of synchronization signal blocks corresponding to a multicast transmission to be received by a user equipment (UE), wherein the multicast transmission comprises control information on a multicast control channel, multimedia broadcast multicast services data on a multicast traffic channel, or both; and
transmit a downlink control channel for scheduling the multicast transmission during one or more monitoring occasions corresponding to the multicast transmission, wherein different ones of the one or more monitoring occasions are associated with different ones of the plurality of synchronization signal blocks such that each of the one or more monitoring occasions is associated with a corresponding synchronization signal block index, and wherein the one or more monitoring occasions corresponding to the multicast transmission are organized into sets of monitoring occasions, each set including one monitoring occasion per a respective synchronization signal block index and organized sequentially by the respective synchronization signal block index.

\* \* \* \* \*